United States Patent [19]

Hirano et al.

[11] Patent Number: 4,820,666

[45] Date of Patent: Apr. 11, 1989

[54] ZIRCONIA BASE CERAMICS

[75] Inventors: Masanori Hirano, Toyoake; Hiroshi Inada, Nagoya, both of Japan

[73] Assignee: Noritake Co., Limited, Nagoya, Japan

[21] Appl. No.: 842,496

[22] Filed: Mar. 21, 1986

[30] Foreign Application Priority Data

Mar. 22, 1985 [JP] Japan ................................ 60-59154
Mar. 25, 1985 [JP] Japan ................................ 60-60503
Jul. 8, 1985 [JP] Japan ................................ 60-149472

[51] Int. Cl.$^4$ ............................................ C04B 35/48
[52] U.S. Cl. .................................. 501/104; 501/105; 501/152
[58] Field of Search ........................ 501/105, 104, 152

[56] References Cited

U.S. PATENT DOCUMENTS

| | | | |
|---|---|---|---|
| 4,316,964 | 2/1982 | Lange | 501/105 |
| 4,525,464 | 6/1985 | Claussen et al. | 501/105 |
| 4,587,225 | 5/1986 | Tsukuma et al. | 501/152 |
| 4,610,967 | 9/1986 | Imanishi et al. | 501/152 |

FOREIGN PATENT DOCUMENTS

| | | |
|---|---|---|
| 0129188 | 12/1984 | European Pat. Off. ............ 501/105 |
| 52-86413 | 7/1977 | Japan . |
| 54-61215 | 5/1979 | Japan . |
| 54-25523 | 8/1979 | Japan . |
| 55-158173 | 12/1980 | Japan . |
| 56-41873 | 4/1981 | Japan . |
| 58-32066 | 2/1983 | Japan . |
| 58-172265 | 10/1983 | Japan . |
| 59-64567 | 4/1984 | Japan . |
| 59-152266 | 8/1984 | Japan . |
| 59-190265 | 10/1984 | Japan . |
| 60-60980 | 4/1985 | Japan . |
| 60-141671 | 7/1985 | Japan . |

OTHER PUBLICATIONS

American Ceramic Society Bulletin, 55: 717-727 (1976).
The Ceramic Fundamental Forum held in Jan. 1985, IC 10P88.
Gupta, T. K. et al., Journal of Materials Science, 12: 2421-2426 (1977).
Sato, Tsugio et al., Zirconia Ceramics 5: 75-85 (1985).
Sato, T., et al., FC Report 5 (1987) No. 5, pp. 161-168.
Sato, T., et al., Extended Abstracts Zirconia, '86 Tokyo the 3rd International Conference on the Science and Technology of Zirconia, The Ceramic Society of Japan.
Watanabe, T., Digest of Annual Conference of the Ceramic Society of Japan, 1984, pp. 463-464.
Yogyokisotoronkai (Ceramic Fundamental Forum), 1984, 1A6, p. 10.
Yogyo Kyokai Nenkai (Annual Conference of Ceramic Association of Japan), held in May, 1984, 124P463.

Primary Examiner—William R. Dixon, Jr.
Assistant Examiner—David M. Brunsman
Attorney, Agent, or Firm—Ciotti & Murashige, Irell & Manella

[57] ABSTRACT

The invention consists of zirconia base with high hydrothermal stability which:

(a) consists essentially of at least 40 weight % of partially stabilized zirconia of the $ZrO_2$-$Y_2O_3$-$CeO_2$ system wherein the proportion of $ZrO_2$, $Y_2O_3$, and $CeO_2$ is within the range defined by the line connecting points F, G, L, M, N and K in a ternary diagram ($ZrO_2$, $YO_{1.5}$, $CeO_2$), the vertices of said points being given by the following molar % of $ZrO_2$, $YO_{1.5}$, and $CeO_2$, respectively:

F (88, 10, 2),
G (89, 10, 1),
L (93.5, 4, 2.5),
M (93, 2, 5),
N (88, 1, 11), and
K (86, 1,13), and 3 to 60 weight % of at least one of $Al_2O_3$, $MgO\cdot Al_2O_3$, spinel and mullite, and (b) has a mean crystal grain size not exceeding 2 micrometers and a bending strength of at least 100 kgf/mm$^2$, said $ZrO_2$ containing a minimum of 50 volume % tetragonal crystal structure and a maximum of 5 volume % monoclinic crystal structure when tested in steam of 180° C. and 10 atm for 10 hours. The monoclinic crystal structure does not exceed 5 volume % when tested in an atmosphere of 300° C. for 3000 hours. These zirconia base ceramics are stable in the presence of moisture under low temperatures of approximately 200°–400° C.

26 Claims, 10 Drawing Sheets

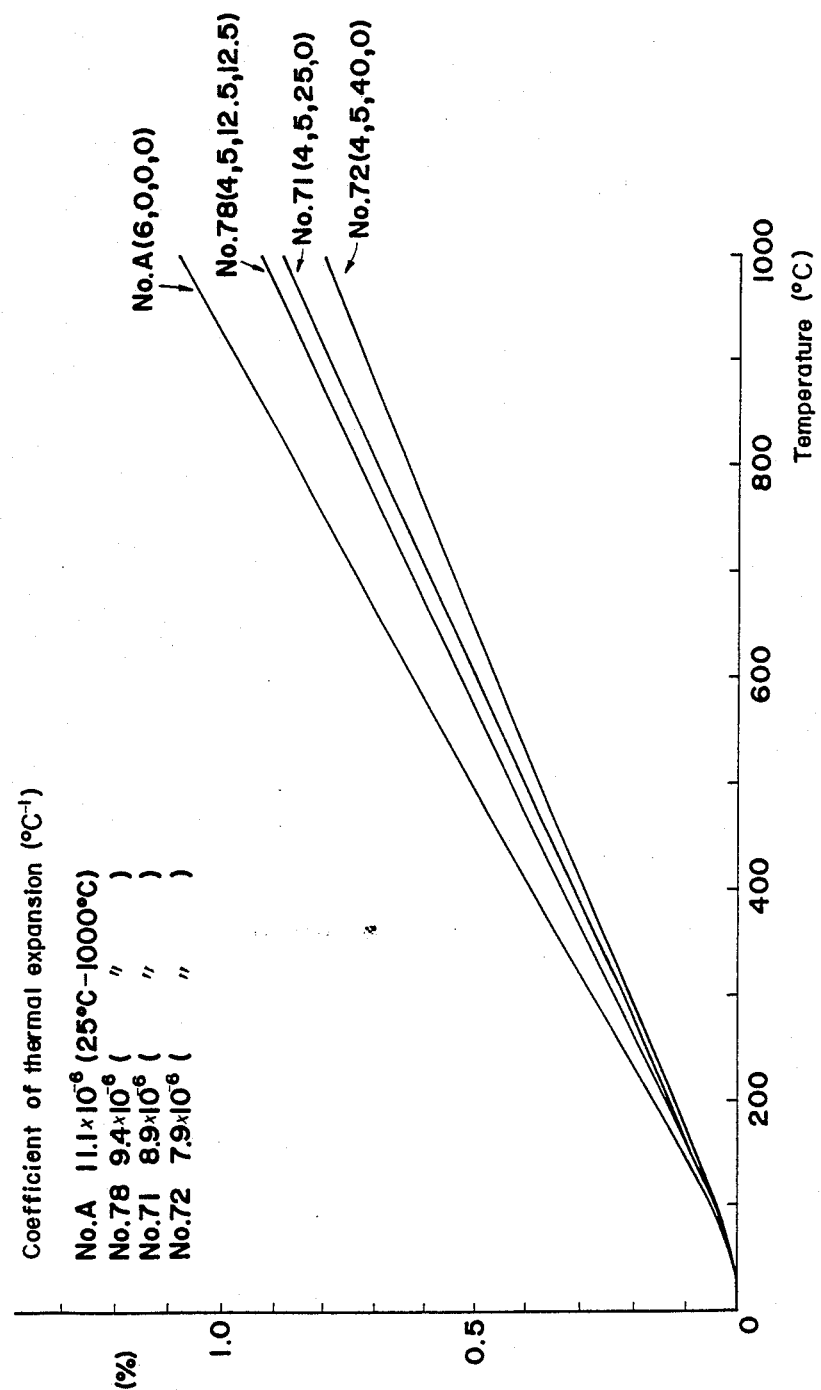

ZIRCONIA BASE CERAMICS

BACKGROUND OF THE INVENTION

The present invention relates to zirconia base ceramics.

Zirconia base ceramics (hereinafter referred often to as $ZrO_2$ ceramics) generally has high toughness, but involves an essential problem of deterioration with the lapse of time due to phase transition.

During cooling, $ZrO_2$ undergoes a martensitic-type transformation from a tetragonal crystal structure to a monoclinic crystal structure with a concurrent increase in volume and an anisotropic shape change. For pure $ZrO_2$ the transformation begins at about 1200° C. and proceeds until complete at about 600° C.

Attempts have been made to utilize this transformation in order to improve the fracture toughness of ceramic composites.

For that reason, the addition of stabilizers is usually carried out for stabilization or partial stabilization, as disclosed in a number of literatures (U.S. Pat. No. 4,316,964; Japanese Patent Kokoku-Publication No. 54-25523). Attempts have also been made to improve the properties of $ZrO_2$ ceramics by the selective use of a specific stabilizer. First of all, Japanese Patent Kokai-Publication No. 56-134564 discloses that $Y_2O_3$ is selected for the purpose of suppressing the deterioration with time at a certain temperature, T. K. Gupta et al, Journal of Materials Science, 12 (1977) teaches that the same compound is used to improve strength. On the other hand, Japanese Patent Kokai-Publication Nos. 59-152266 and 59-190265 teach the selective addition of $CeO_2$ for the purpose of improving thermal shock resistance.

Other attempts have been made to achieve the improvements in properties from another point-of-view by the addition of a third component in addition to the stabilizers. For instance, Japanese Patent Kokai-Publication No. 58-32066 discloses that further improvements in strength are intended by the selective addition of $Al_2O_3$, and Japanese Patent Kokai-Publication No. 58-172265 describes that the low coefficient of expansion is obtained by the same means.

As mentioned above, the zirconia base ceramics have hitherto received special attention due to its high strength and high resistance to fracture. This high strength and high resistance to fracture of these ceramics have been thought to be attributable to the stress induced phase transformation. However, it has been shown that the high strength and high resistance of zirconia base ceramics, especially $Y_2O_3$-PSZ, was greatly decreased by low-temperature annealing such as in the range 200° C. to 400° C. in air. The loss of strength and fracture toughness by annealing is due to the formation of microcracking accompanied by the tetragonal to monoclinic phase transformation on the surface of the sintered materials. This degradation accompanied by the tetragonal to monoclinic phase transformation of $Y_2O_3$-PSZ by low temperature annealing in wet atmosphere occurs with a high rate and at lower temperatures than the case in a dry atmosphere. Namely, yttria stabilized zirconias are not stable at low temperatures (around 300° C.) in the presence of steam.

However, until now there have not been any zirconia base ceramics that are high in both toughness and strength and have satisfactory thermal and hydrothermal stabilities.

SUMMARY OF THE DISCLOSURE

A primary object of the present invention is to improve zirconia base ceramics with respect to the low temperature stability of $Y_2O_3$-PSZ in the presence of water vapor. Another object of the present invention is to improve zirconia base ceramics having high toughness and strength with respect to the hydrothermal stability and the thermal stability.

Another object of the present invention is to further provide the $ZrO_2$ ceramics with increased chemical stability.

A further object of the present invention is to further improve $ZrO_2$ ceramics in strength at high temperatures, i.e., thermal stability.

A still further object of the present invention is to provide $ZrO_2$ ceramics which have an appropriately reduced coefficient of thermal expansion.

According to a first aspect of the present invention, there is provided zirconia base ceramics of the $ZrO_2$-$Y_2O_3$-$CeO_2$-$Al_2O_3$ system (may be referred to as $Al_2O_3$ system).

More specifically, there is provided zirconia base ceramics which:

(a) consists essentially of at least 40 weight % of partially stabilized zirconia (PSZ) of the $ZrO_2$-$Y_2O_3$-$CeO_2$ system wherein the proportion of $ZrO_2$, $Y_2O_3$ and $CeO_2$ is within the range defined by the following A, B, C, D and E in a ternary diagram ($ZrO_2$, $YO_{1.5}$, $CeO_2$) the vertices of which are given by $ZrO_2$, $YO_{1.5}$ and $CeO_2$ by mol %:

A (87.5, 12, 0.5),
B (95.5, 4, 0.5),
C (95.5, 2, 2.5),
D (92.5, 0.5, 7.0), and
E (85, 0.5, 14.5)

and 3 to 60 weight % of $Al_2O_3$, and (b) has a mean crystal grain size not exceeding 2 micrometer and a bending strength of at least 100 kgf/mm$^2$, said $ZrO_2$ including at least 50 vol % of a tetragonal crystal structure and containing not exceeding 30 vol % of a monoclinic crystal structure after maintained for 10 hours in water vapor of 180° C. and 10 atm.

The zirconia ceramics according to this aspect of the present invention have high toughness and strength and shows improved thermal and hydrothermal stability, which results in an excellent low temperature stability in the presence of water vapor. This is considered to be due to the fact that the addition of $Al_2O_3$ serves to eliminate deficiencies due to its sintering aid effect, contributes to increase the amount of fracture energy due to increases in the content of a tetragonal crystal structure and hence the modulus of elasticity, and the hydrothermal resistance is markedly improved as a result of the synergetic effect of reinforcement of the grain boundary region of $ZrO_2$ and stability owing to the co-presence of $Y_2O_3$ and $CeO_2$ components as the stabilizer over the conventional $Y_2O_3$-PSZ.

According to a second aspect of the present invention, there is provided zirconia base ceramics of the $ZrO_2$-$Y_2O_3$-$CeO_2$-MgO.$Al_2O_3$ spinel system (may be referred to as spinel system). It is here noted that the quantitative relation, etc. are basically identical with those obtained by substituting spinel for $Al_2O_3$ in the $Al_2O_3$ system. According to this second aspect of the present invention, high chemical stability is further obtained with high toughness and strength as well as improved hydrothermal resistance and thermal stability. This appears to result from the dispersion of the $MgO\cdot Al_2O_3$ spinel component, which serves to inhibit the growth of $ZrO_2$ grains and eliminate sintering deficiencies due to its sintering aid effect, and increase the content of tetragonal $ZrO_2$.

According to a third aspect of the present invention, there is provided zirconia base ceramics of the $ZrO_2$-$Y_2O_3$-$CeO_2$-$3Al_2O_3$ $2SiO_2$ (mullite) system (may be referred to as mullite system). It is here noted that the quantitative relation, etc. are basically identical with those obtained by substituting mullite for $Al_2O_3$ in the $Al_2O_3$ system. The term "mullite" refers to a composition having an $Al_2O_3/SiO_2$ ratio of 65/35 to 75/25.

According to this third aspect of the present invention, improved stength at elevated temperatures is obtained with improved hydrothermal and thermal stability in addition to high toughness and strength. The presence of mullite serves to reduce the coefficient of thermal expansion.

This appears to be due to the fact that the fine structure of a sintered body is controlled by the fine dispersion of acicular crystals which are the $3Al_2O_3\cdot 2SiO_2$(-mullite) component, whereby improved strength at normal temperature is obtained, and deterioration through the transformation from tetragonal to monoclinic in the hot and the hydrothermal conditions is suppressed due to the synergetic effect of the reinforcement of the grain boundary region and the co-presence of $Y_2O_3$ and $CeO_2$. At least 10 wt % of mullite gives a coefficient $\alpha$ of linear thermal expansion of $10^{-5\circ}$ C.$^{-1}$ or lower at a temperature between 25° C. and 1000° C.

In the 2nd and 3rd aspects of the present invention, similar results are obtained, even when $Al_2O_3$ is substituted for a part of $MgO\cdot Al_2O_3$ spinel or mullite.

The present invention also provides economically advantageous $ZrO_2$ ceramics, since the stabilizer $CeO_2$ and the additive $Al_2O_3$ are more inexpensive than $Y_2O_3$ and $ZrO_2$ used for the same purpose in the conventional partially stabilized zirconia sintered bodies of the $Y_2O_3$-$ZrO_2$ system.

According to a fourth aspect of the present invention, there is provided zirconia base ceramics containing the given amounts of $MgO\cdot Al_2O_3$ spinel and mullite in place of $Al_2O_3$. The coexistence of the spinel and mullite gives very preferable zirconia base ceramics through the synergetic effect of their own advantages. It is advantageous that the total and separate amounts of the spinel and mullite be at least 5 weight % and at least 3 weight %, respectively.

$Al_2O_3$ may be substituted for a part of the amount of the coexistent spinel and mullite. The effect due to the incorporation of $Al_2O_3$ is then added.

Thus, the $ZrO_2$ ceramics of the present invention, which can satisfy high strength and high toughness as well as thermal and hydrothermal stability, is best suited for use in, for instance, wear-resistant ceramic screws for injection molding machines for thermoplastic resins or ceramics, said screws being repeatedly subjected to heat and pressure, hot extrusion dies for brass rods or copper tube shells, surgical shears or knives subjected to repeated sterilization by boiling, and the like, and makes a great contribution to applicability to cutting tools, industrial cutters, dies, internal combustion engines, pumps, artificial bone, artificial dental roots, precision machinery tools and the like and improvements in the performance thereof.

Preferred embodiments of the present invention will be described in the appended dependent claims, and will be disclosed in the following further detailed explanation.

BRIEF DESCRIPTION OF THE DRAWINGS

FIG. 10 is a graph showing the relation between the coefficient of thermal expansion and the temperature of thermal expansion testing according to Example 11.

DESCRIPTION OF THE PREFERRED EMBODIMENTS

The zirconia base ceramics of the present invention should contain at least one of $Al_2O_3$, $MgO\cdot Al_2O_3$ spinel or $3Al_2O_3\cdot 2SiO_2$ (hereinafter referred generally to the $Al_2O_3$ system compounds) within the range of 3 to 60 weight %. Three (3) weight % or less of the $Al_2O_3$ system compounds leads to a lowering of hydrothermal stability and are thus less effective. On the other hand, sixty (60) weight % or higher of the $Al_2O_3$ system compounds causes to reduce the content of partially stabilized $ZrO_2$ contributing to improvements in toughness. To make the present invention more effective, a range of 5 to 50 weight % may be selected. However, the total amount of mullite and spinel is at least 5 weight % to attain the effect of their coexistence (Fourth Aspect).

According to the present invention, the preferred properties of the partially stabilized zirconia are assured by the incorporation, in the given ratio, of $CeO_2$ and $Y_2O_3$ as the stabilizers for $ZrO_2$.

Figure 1:
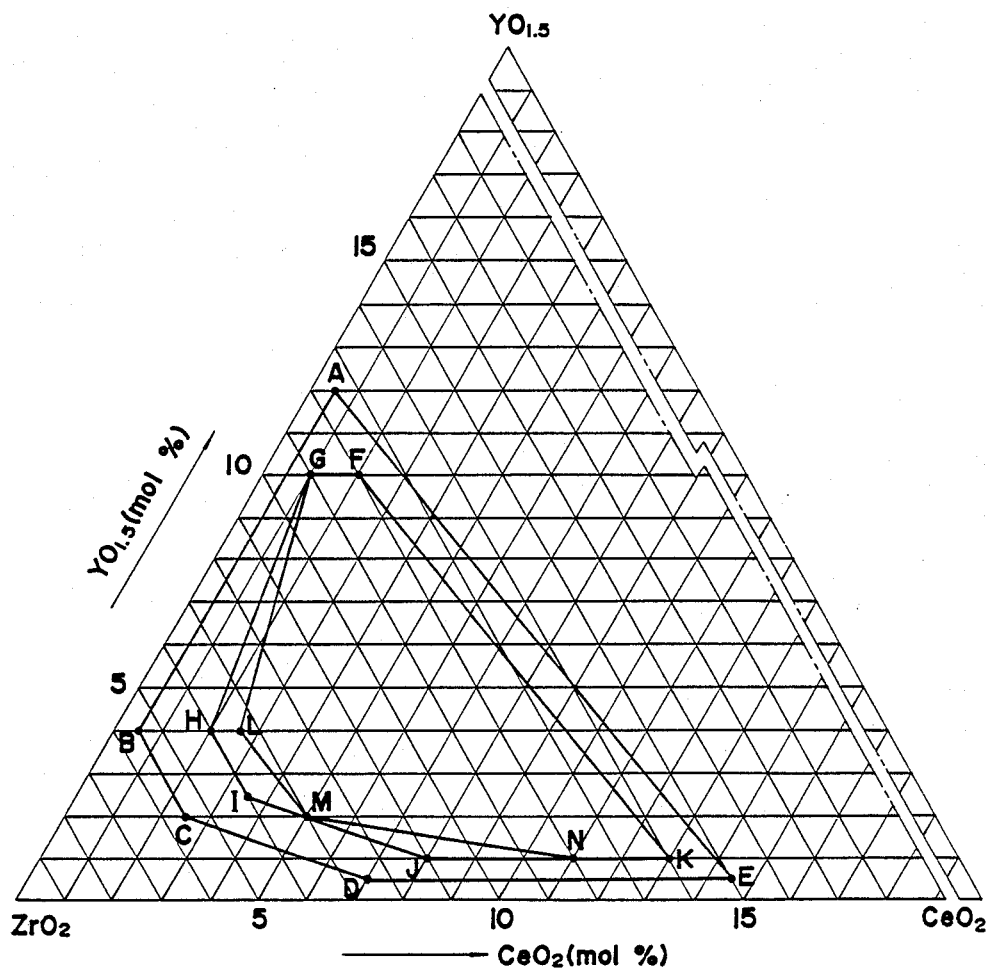
FIG. 1 is a ternary (triangular) diagram showing the compositional range of $ZrO_2$, $YO_{1.5}$ and $CeO_2$.

It is required that the ternary proportion of $ZrO_2$, $Y_2O_3$ and $CeO_2$ be within the range surrounded with the lines connecting the points A, B, C, D and E in the ternary (triangular) diagram system ($ZrO_2$, $YO_{1.5}$ and $CeO_2$), as shown in FIG. 1, the vertices of which are given by $ZrO_2$, $YO_{1.5}$ and $CeO_2$. That range will hereinafter be referred to as the A-E range. That is to say by molar %:

A (87.5, 12, 0.5),
B (95.5, 4, 0.5),

C (95.5, 2, 2.5),
D (92.5, 0.5, 7.0), and
E (85, 0.5, 14.5).

Within the aforesaid A-E range, the resulting tetragonal crystal structure shows high stability and excels in hydrothermal stability. When that range is not satisfied, however, the resulting tetragonal crystal structure shows considerably reduced hydrothermal stability, and is poor in mechanical properties. In other words, an amount of $YO_{1.5}$ higher than that defined by Point A (12 mol % $YO_{1.5}$) leads to a lowering of toughness, and an amount of $YO_{1.5}$ lower than that defined by Point B (4 mol % $YO_{1.5}$ results in the loss of hydrothermal stability. Amounts of $YO_{1.5}$ and $CeO_2$ less than those defined by Point C (2 mol % $YO_{1.5}$; 2.5 mol % $CeO_2$) result in poor hydrothermal stability. An amount of $CeO_2$ less than that defined by Point D (7 mol % $CeO_2$) results in poor stability in hot water, and an amount of $CeO_2$ higher than that defined by Point E (14.5 mol % $CeO_2$) results in insufficient mechanical strength being obtained.

To make the present invention more effective, it is preferred that the proportion of the aforesaid three components be, in the ternary diagram as shown in FIG. 1, within the following range defined by F, G, H, I, J and K (referred to as the F-H-K range):

F (88, 10, 2),
G (89, 10, 1),
H (94, 4, 2),
I (94, 2.5, 3.5),
J (91, 1, 8), and
K (86, 1, 13).

The F-H-K range provides a further improved thermal stability and an excellent hydrothermal stability. Namely, at more amounts of $YO_{1.5}$ than the Points F and G the mechanical properties appears somewhat insufficient, and at the region below the line connecting H, I and J where less amounts of $YO_{1.5}$ and $CeO_2$ are contained, the hydrothermal stability appears not completely sufficient though a substantial thermal stability is assured. At the region of more $CeO_2$ than the Point K, the mechanical properties appears not completely sufficient.

A still narrower range defined by the points F, G, L, M, N and K is most preferred (referred to as F-L-K range), wherein both the hydrothermal and thermal stability is most excellent. The F-L-K range is defined as follows:

F (as above F),
G (as above G),
L (93.5, 4, 2.5),
M (93, 2, 5),
N (88, 1, 11), and
K (as above K).

It is understood that the $ZrO_2$ ceramics of the present invention can exhibit quite the same properties, even though the whole or a part of $ZrO_2$ is substituted by $HfO_2$.

It is required that the sintered body of the present invention have a mean crystal grain size of 2 micrometer or less. A mean crystal grain size of 1 micrometer or less is prefered. A mean crystal grain size exceeding 2 micrometer causes easy transformation from the tetragonal to monoclinic crystal structure, thus resulting in a deterioration of the hydrothermal and thermal stability. The finer of the average grain size of the sintered body, the most excellent hydrothermal and thermal stabilities result.

To afford improved hydrothermal stability to the $ZrO_2$ ceramics of the present invention, it is desired that it have a density relative to theoretical of at least 97.5%, more preferably at least 99%.

It is required that the $ZrO_2$ ceramics of the present invention be partially stabilized zirconia (PSZ) comprising a tetragonal crystal structure. Owing originally to its metastable phase, the tetragonal crystal structure is partially transformed to the monoclinic crystal structure by surface griding of the sample, so that the compressive stress remaining on the surface layer makes a contribution to reinforcing of the sintered body. The obtained degree of such reinforcement is dependent upon the surface roughness by grinding and the crystal grain size of the sintered body. It is here noted that the wording "partially stabilized zirconia (PSZ) comprising a tetragonal crystal structure" used in the present disclosure refers to zirconia found to contain at least 50%, preferably at least 80%, more preferably 90%, by volume, of the tetragonal crystal system by the X-ray diffraction of crystal phases in a mirror-finished state. It is required that the quantity of the tetragonal crystal structure be at least 50%, since there is a drop of toughness in an amount of below 50%.

A density, relative to theoretical, of at least 97.5% or at least 99% permits micropores of at least 30 $\mu$m or at least 10 $\mu$m in size to be removed, respectively.

It is also required that the quantity of the monoclinic crystal structure do not exceed 30 vol % after maintained in saturated steam of 180° C. and 10 atm for 10 hours. This is because, when that quantity exceeds 30 vol %, there is deterioration in the hydrothermal stability. A preferred monoclinic quantity is not exceeding 10% corresponding to the F-H-K range, and more particularly not exceeding 5% corresponding to the F-L-K range.

In addition, it is required that the quantity of the monoclinic crystal structure as not exceed 30 vol % after maintained in the atmosphere of 300° C. for 3000 hours. This is because when that quantity exceeds 30 vol %, there is deterioration in the strength due to structural change on the sintered body surface. A preferred quantity is not exceeding 10% (F-H-K range), more particularly not exceeding 5% (F-L-K range).

In the 2nd aspect of the present invention, it is required that the quantity of the monoclinic crystal structure be 30 vol % or less, after maintained in sulfuric acid for 100 hours (for which the spinel amount is preferably at least 10 wt %). Above 30 wt % spinel, deterioration in the strength occurs due to the structural change on the surface of the sintered body. In this regard, the quantity of the monoclinic phase should be preferably at most 10 vol %, more preferably at most 5 vol %, for which the spinel amount should be at least 15 wt %, more preferably 20 wt %, respectively. Generally considering, the spinel amout of 15-35 wt % is preferred. The PSZ system is preferably within the F-H-K range.

In the 3rd aspect of the present invention, the high temperature bending strength at 500° C. should be at least 50 kgf/mm$^2$, for which the mullite amount should be at least 10 wt % and the PSZ system may be within the A-E range.

For instance, the $ZrO_2$ ceramics of the present invention may be produced in the following manner. The starting various components are pulverized to powders which are in turn compacted into the desired shape, if required, with the addition of a forming aid, usually an organic substance as polyvinyl alcohol. The resulting compact is then sintered at 1350°–1650° C. under normal pressure or under pressure for 0.5 to 5 hours in the atmosphere or vacuum, or in an atmosphere of any one of oxygen, hydrogen, and an inert gas such as $N_2$ or argon gas. In accordance with the present invention, the sintering may also be carried out by the hot press (HP) or hot isostatic press (HIP) technique. In the case of the HP technique, the compacted body is placed in a graphite mold in a nonoxidizing atmosphere, and is sintered at 1350° to 1650° C. under a pressure of 50–300 kgf/cm$^2$. When the HIP technique is applied, it is preferred that normal-pressure sintering, sintering in a pressurized gas atmosphere, hot press or the like press be applied to obtain a presintered product having a density of at least 95% relative to the theoretical and showing no air permeability, and sintering may be thereafter carried out at a temperature ranging from 1100° C. to 1800° C. (preferably 1300°–1650° C.) under a gas pressure of at least 1000 kgf/cm$^2$ in a hot isostatic press.

Reference will now be made to the $ZrO_2$, $Y_2O_3$ and $CeO_2$ components for the PSZ system. Referring first to the $ZrO_2$ component, it is preferred that a sol and/or a water-soluble salt of $ZrO_2$ (oxychloride, carbonate or nitrate, etc. of zirconium) are/is uniformly mixed with water-soluble salts of $Y_2O_3$ and $CeO_2$ (chloride, nitrate or acetate, etc. of yttrium; chloride, nitrate or acetate, etc. of cerium) in the state of a solution, followed by separation (referred to as the coprecipitation method). The thus obtained precipitate may be used as the starting material. This renders it possible to use as the starting material the easy-to-sinter pulverulent body consisting of extremely fine particles, in which the $ZrO_2$, $Y_2O_3$ and $CeO_2$ components are uniformly dispersed. The resulting sintered body is of a fine and uniform structure which is substantially free from any micropore. It is here noted that the term "micropore" refers to that having a pore size of 30 micrometer or more.

Referring to the $Al_2O_3$ type compounds, it is used in the form of a sol and/or an aluminium salt (chloride, nitrate or sulfate, etc. of aluminum), and is uniformly mixed with the $ZrO_2$, $Y_2O_3$ and $CeO_2$ components in a water-soluble state, followed by separation. The resulting precipitates may be used as the raw material. This renders it possible to finely and uniformly disperse the $Al_2O_3$ grains into the zirconia sintered body.

However, both spinel and mullite should be added as crystal grains, or in a state of being crystallized as disperse or isolated grains at the time of sintering. Naturally occurring or synthetic spinel and mullite may be used, and synthetic polycrystalline products such as fused mullite may also be useful.

It should be understood that following Examples are being presented for better elucidation of the present invention and not for merely limitative purpose, and that any modifications or changes as apparent in the art may be done without departing from the inventive concept.

EXAMPLE 1

An aqueous solution of zirconium oxychloride of 99.9% purity was uniformly mixed with yttrium chloride of 99.9% purity, and the resulting solution was coagulated with 6N ammonia water to obtain precipitates in the form of a hydroxide followed by washing with water and drying (generally referred to as coprecipitation method). The dried product was calcined at 900° C. for 2 hours, wet-milled by a ball mill for 48 hours and dried to obtain zirconia powders which were partially stabilized by yttrium, and had the compositions, as specified in Table 1, containing 0, 2.5, 4, 6, 8 and 10 mol % of $YO_{1.5}$. The thus obtained powders had an average particle size of 0.5 micrometer and a specific surface area of 25 m$^2$/g. $CeO_2$ having a specific surface area of 35 m$^2$/g and a purity of 99.9% and $Al_2O_3$ having a mean particle size of 0.3 micrometer and a purity of 99.9% were added to the powders into the proportions as set forth in Table 1 followed by adding polyvinyl alcohol of 2 wt % as a compacting agent. The resulting product was wet-mixed in a ball mill for 24 hours, dried and granulated. The obtained granules were isostatically compacted at a pressure of 1.5 ton/cm$^2$, and were then sintered at a temperature of 1400°–1650° C. for 2 hours in the atmosphere. All the sintered bodies thus obtained had a mean crystal grain size of 2 μm or less. For the purpose of comparison, Table 1 also sets forth the results of $Al_2O_3$-free sintered bodies obtained by the same compacting and sintering.

The sintered bodies thus obtained were each cut into 3×4×40 mm, and finished by polishing, and were measured in respect of the crystal phase, density, average grain size, bending strength and fracture toughness ($K_{IC}$) and well as the surface crystal phase and bending strength after hydrothermal deterioration testing and after thermal deterioration testing. The measuring methods of various physical properties are as follows.

(a) Bending strength was measured according to JIS-R-1601-1981 by carrying out three-points bending tests at a span of 30 mm and a crosshead speed of 0.5 mm/min with sample pieces measuring 3×4×40 mm, and 10 measurement results were averaged.

(b) Fracture toughness was measured in accordance with the indentation-microfracture method wherein indentation was carried out under a load of 50 kg, and the values of Kic were determined from the equation of Niihara et al [J. Mater. Sci. Lett., 2, 221 (1983); J. Mat. Sci. Lett., 1, 13 (1982)].

(c) Density was measured by Alchimedes method.

(d) Average crystal grain size was measured on an etched surface after mirror finishing of the sintered body, then observed by scanning type electromicroscope, wherein the length of at least 50 grains crossing a straight line along the line was measured and averaged to $\bar{l}$, and the average grain size $\bar{d}$ was calculated by the equation: $\bar{d} = \frac{3}{2} \bar{l}$.

(e) Quantitative measurement of crystal phase was based on X-ray diffraction. More specifically, the quantity of a monoclinic crystal structure was determined from Equation (1):

$$\text{Monoclinic Quantity} = \frac{Im}{It + Ic + Im} \times 100 \quad (1)$$

wherein Im is the integration intensity of the (111) and (11$\bar{1}$) planes of the monoclinic crystal structure of each sample piece mirror-finished with a diamond paste, and It and Ic are the integration intensities of the (111) plane of the tetragonal crystal structure thereof and the (111) plane of the cubic crystal structure thereof, respectively. Subsequently, the sintered bodies were each finely pulverized to 5 micrometer or less, and the integration intensities Im* and Ic* of monoclinic $ZrO_2$ and cubic $ZrO_2$ were remained under the same conditions by means of X-ray diffraction. That is to say, in the course of such pulverization, the tetragonal $ZrO_2$ present in each sintered body is believed to be transformed into the monoclinic $ZrO_2$ by a mechanical stress. Therefore, the quantity of a cubic crystal structure is determined from Equation (2):

$$\text{Cubic Quantity} = \frac{Ic^*}{Im^* + Ic^*} \times 100 \quad (2)$$

and the quantity of a tetragonal crystal structure was then determined from the Equation Tetragonal Ouantity = 100 − {(Monoclinic Quantity) + (Cubic Quantity)}.

(f) The Hydrothermal deterioration testing: Each sample was maintained in saturated water vapor of 180° C. (10 atm) within an autoclave for predetermined periods of time (10–30 hours), and was removed therefrom to measure its physical properties. The quantity of the monoclinic crystal structure after the hydrothermal deterioration testing was again determined from Equation (1) by the X-ray diffraction of the surface of each sample.

(g) The thermal deterioration testing: Each Sample was maintained in an electric furnace at 300° C. for 3000 hours, and measured as the testing (f).

The test results are shown in Table 1. Sample Nos. 1–23 of Table 1 are ones such that the $Al_2O_3$ amount is set at 25 wt % and $YO_{1.5}$ is gradually increased from 0 to 10 mol % along with $CeO_2$ addition in various amounts. Sample Nos. 24–31 are comparative samples without $Al_2O_3$. As apparent from Table 1, the zirconia base sintered body of the present invention provides significant inhibition of the transformation from tetragonal to monoclinic phase in the hot and the hydrothermal conditions, and retains a high strength after the hydrothermal deterioration testing showing almost no deterioration. On the contrary, the comparative samples outside of the inventive scope show no inhibition of the transformation to the monoclinic phase resulting in deteriorated strength.

TABLE 1

| Sample Nos. | $YO_{1.5}$ (mol %) | $CeO_2$ (mol %) | $ZrO_2$ (mol %) | $Al_2O_3$ (wt %) | Sintering Temp. (°C.) | Density (g/cm³) | $K_{IC}$ (MN/m$^{3/2}$) | Bending Strength (kgf/mm²) |
|---|---|---|---|---|---|---|---|---|
| *1 | 0 | 7 | 93 | 25 | 1500 | 5.39 | 7.1 | 134 |
| 2 | 0.5 | 13 | 86.5 | " | " | 5.40 | 6.7 | 133 |
| 3 | 1.0 | 11.5 | 87.5 | " | " | 5.40 | 6.7 | 132 |
| 4 | 1.0 | 13 | 86 | " | " | 5.41 | 6.6 | 125 |
| *5 | 1.0 | 16 | 83 | " | " | 5.38 | 5.4 | 84 |
| *6 | 2.5 | 2 | 95.5 | " | " | 5.39 | 7.0 | 148 |
| 7 | 2.5 | 6 | 91.5 | " | " | 5.39 | 6.6 | 150 |
| 8 | 2.5 | 8 | 89.5 | " | " | 5.38 | 6.5 | 142 |
| *9 | 2.5 | 15.5 | 82 | " | " | 5.36 | 5.1 | 80 |
| *10 | 4 | 0 | 96 | " | " | 5.40 | 6.9 | 155 |
| 11 | 4 | 4 | 92 | " | " | 5.40 | 6.7 | 157 |
| 12 | 4 | 6 | 90 | " | " | 5.40 | 6.5 | 155 |
| 13 | 4 | 8 | 88 | " | " | 5.38 | 6.2 | 150 |
| *14 | 4 | 14 | 82 | " | " | 5.36 | 5.0 | 78 |
| *15 | 6 | 0 | 94 | " | " | 5.39 | 6.1 | 150 |
| 16 | 6 | 4 | 90 | " | " | 5.38 | 5.6 | 152 |
| 17 | 6 | 6 | 88 | " | " | 5.36 | 5.5 | 145 |
| *18 | 6 | 12 | 82 | " | " | 5.35 | 4.9 | 65 |
| *19 | 8 | 0 | 92 | " | " | 5.36 | 5.7 | 131 |
| 20 | 8 | 2 | 90 | " | " | 5.36 | 5.4 | 130 |
| 21 | 8 | 4 | 88 | " | " | 5.35 | 5.2 | 127 |
| *22 | 8 | 10 | 82 | " | " | 5.35 | 4.9 | 48 |
| 23 | 10 | 2 | 88 | " | " | 5.35 | 5.0 | 108 |
| *24 | 2.5 | 6 | 91.5 | 0 | 1500 | 6.05 | 8.3 | 85 |
| *25 | 4 | 4 | 92 | " | " | 6.07 | 8.2 | 83 |
| *26 | 4 | 6 | 90 | " | " | 6.03 | 7.5 | 78 |
| *27 | 4 | 11 | 85 | " | " | 5.98 | 5.4 | 62 |
| *28 | 6 | 4 | 90 | " | " | 6.02 | 7.2 | 80 |
| *29 | 6 | 8 | 86 | " | " | 6.00 | 5.5 | 55 |
| *30 | 8 | 2 | 90 | " | " | 5.98 | 7.3 | 57 |
| *31 | 8 | 8 | 84 | " | " | 5.98 | 5.2 | 45 |

| Sample Nos. | $ZrO_2$ Crystal (%) Monoclinic | Tetragonal | Cubic | Hydrothermal Deterioration Test Results (after 30 hrs) Monoclinic | Bending Strength After Testing (kgf/mm²) | Thermal Deterioration Test Results (after 3000 hrs) Monoclinic | Bending Strength After Testing, (kgf/mm²) |
|---|---|---|---|---|---|---|---|
| *1 | 0 | 100 | 0 | 77 | 27 | 65 | 35 |
| 2 | 0 | 90 | 10 | 7 | 131 | 0 | 130 |
| 3 | 0 | 95 | 5 | 3 | 130 | 0 | 132 |
| 4 | 0 | 77 | 23 | 0 | 120 | 0 | 121 |
| *5 | 0 | 60 | 40 | 0 | 56 | 0 | 79 |
| *6 | 0 | 100 | 0 | 75 | 21 | 61 | 37 |
| 7 | 0 | 94 | 6 | 4 | 145 | 0 | 143 |
| 8 | 0 | 83 | 17 | 3 | 137 | 0 | 139 |
| *9 | 0 | 25 | 75 | 0 | 60 | 0 | 73 |
| *10 | 0 | 95 | 5 | 71 | 15 | 58 | 34 |
| 11 | 0 | 89 | 11 | 5 | 155 | 0 | 151 |
| 12 | 0 | 75 | 25 | 2 | 153 | 0 | 157 |
| 13 | 0 | 70 | 30 | 0 | 146 | 0 | 144 |
| *14 | 0 | 20 | 80 | 0 | 57 | 0 | 75 |
| *15 | 0 | 84 | 16 | 57 | 32 | 54 | 41 |

TABLE 1-continued

| | | | | | | | |
|---|---|---|---|---|---|---|---|
| 16 | 0 | 74 | 26 | 3 | 150 | 0 | 153 |
| 17 | 0 | 67 | 33 | 2 | 139 | 0 | 143 |
| *18 | 0 | 13 | 87 | 0 | 55 | 0 | 61 |
| *19 | 0 | 76 | 24 | 43 | 41 | 38 | 47 |
| 20 | 0 | 73 | 27 | 4 | 128 | 0 | 126 |
| 21 | 0 | 6 | 40 | 2 | 120 | 0 | 131 |
| *22 | 0 | 5 | 95 | 0 | 45 | 0 | 44 |
| 23 | 0 | 52 | 48 | 0 | 105 | 0 | 109 |
| *24 | 0 | 95 | 5 | 45 | 10 | 11 | 66 |
| *25 | 0 | 85 | 15 | 47 | 13 | 9 | 67 |
| *26 | 0 | 70 | 30 | 42 | 18 | 10 | 59 |
| *27 | 0 | 55 | 45 | 0 | 60 | 0 | 61 |
| *28 | 0 | 68 | 32 | 40 | 20 | 12 | 69 |
| *29 | 0 | 45 | 55 | 0 | 54 | 0 | 57 |
| *30 | 0 | 50 | 50 | 39 | 21 | 9 | 50 |
| *31 | 0 | 28 | 72 | 0 | 42 | 0 | 44 |

Note
*Comparison Sample

EXAMPLE 2

An aqueous solution of zirconium oxychloride of 99.9% purity was uniformly mixed with yttrium chloride of 99.9% purity and cerium chloride of 99.9% purity, and the resulting solution was coagulated with 6N ammonia water to obtain precipitates in the form of a hydroxide followed by washing with water and drying. The dried product was calcined at 900° C. for 2 hours, wet-milled by a ball mill for 48 hours and dried to obtain zirconia powders which were partially stabilized, and had the compositions, as specified in Table 2. The thus obtained powders had an average particle size of 0.5 micrometer and a specific surface area of 25 m²/g. $Al_2O_3$ having a mean particle size of 0.3 micrometer and a purity of 99.9% was added to the powders into the proportions as set forth in Table 2 followed by adding the compacting aid, wet-mixing, drying and granulating as in Example 1. The obtained granules were isostatically compacted then sintered and measured as in Example 1. All the sintered bodies thus obtained had a mean crystal grain size of 2 micrometers or less.

The test results are shown in Table 2. Sample Nos. 32–38 of Table 2 are ones such that the $YO_{1.5}$ and $CeO_2$ amounts are set constant (mol %) and $Al_2O_3$ (wt %) is gradually increased. As apparent from Table 2, the zirconia base sintered body of the present invention retains a high strength after the hydrothermal deterioration testing showing almost no deterioration. On the contrary, the comparative samples outside of the inventive scope show severe deterioration in the strength after the thermal deterioration test.

TABLE 2

| | Composition | | | | Sintering | | |
|---|---|---|---|---|---|---|---|
| | $ZrO_2$ Base Composition | | | | | | |
| Sample Nos. | $YO_{1.5}$ (mol %) | $CeO_2$ (mol %) | $ZrO_2$ (mol %) | $Al_2O_3$ (wt %) | Temp. (°C.) | Density (g/cm³) | $K_{IC}$ (MN/m$^{3/2}$) |
| *32 | 4 | 5 | 91 | 0 | 1500 | 6.08 | 8.1 |
| 33 | " | " | " | 5 | " | 5.94 | 7.7 |
| 34 | " | " | " | 10 | " | 5.78 | 6.7 |
| 35 | " | " | " | 25 | " | 5.40 | 6.6 |
| 36 | " | " | " | 40 | 1550 | 5.03 | 6.6 |
| 37 | " | " | " | 60 | " | 4.63 | 6.6 |
| *38 | " | " | " | 80 | 1600 | 4.28 | 4.4 |

| | Bending Strength | $ZrO_2$ Crystal (%) | | | Hydrothermal Deterioration Test Result (after 10 hrs) | Bending Strength after |
|---|---|---|---|---|---|---|
| Sample Nos. | (kgf/mm²) | Monoclinic | Tetragonal | Cubic | Monoclinic | test (kgf/mm²) |
| *32 | 94 | 0 | 82 | 18 | 45 | 21 |
| 33 | 123 | 0 | 84 | 16 | 9 | 112 |
| 34 | 152 | 0 | 85 | 15 | 3 | 151 |
| 35 | 167 | 0 | 87 | 13 | 3 | 165 |
| 36 | 165 | 0 | 88 | 12 | 2 | 162 |
| 37 | 130 | 0 | 87 | 13 | 0 | 127 |
| *38 | 55 | 0 | 85 | 15 | 0 | 50 |

Note
*Comparison Sample

EXAMPLE 3

Zirconia sol solution prepared by hydrolysis of an aqueous solution of zirconium oxychloride of 99.9% purity was uniformly mixed with yttrium chloride and cerium chloride, each of 99.9% purity, and the resulting solution was coagulated with 6N ammonia water to obtain precipitates in the form of a hydroxide followed by washing with water and drying. The dried product was calcined at 850° C. for 2 hours, wet-milled by a ball mill for 48 hours and dried to obtain zirconia powders which were partially stabilized, and had the compositions, as specified in Tables 3, 4 and 5. The thus obtained powders had an average particle size of 0.5 micrometer and a specific surface area of 35 m²/g. $MgO.Al_2O_3$ spinel having 99.9% purity and a diameter of 0.3 micrometer and $Al_2O_3$ having a mean particle size of 0.3 micrometer and a purity of 99.9% were added to the powders into the proportions as set forth in Tables 3, 4 and 5 followed by adding the compacting aid, wet-mixing, drying and granulating as in Example 1. The obtained granules were isostatically compacted then sintered and measured as in Example 1. All the sintered bodies thus obtained had a mean crystal grain size of 2 micrometers or less.

The test results are shown in Tables 3, 4 and 5. Samples of Table 3 are ones such that the $MgO.Al_2O_3$ spinel amount is gradually increased up to 80 wt % by adding it to a partially stabilized zirconia containing $Y_2O_3$ and $CeO_2$ in a predetermined proportion. Comparative sample No. 39 containing no spinel suffered severe deterioration in the strength after the hydrothermal deterioration testing, and showed a great extent of transformation to the monoclinic phase. Contrary thereto, the inventive sample Nos. 40–43 containing specific amounts of spinel show almost no transformation after the hydrothermal testing and retain high bending strength.

On the other hand, sample No. 44 containing spinel more than the inventive specific range shows extreme lowering in the fracture toughness and bending strength.

Table 4 lists the samples prepared by adding $Al_2O_3$ and $MgO.Al_2O_3$ spinel each in various amounts (wt %) to a partially stabilized zirconia containing $Y_2O_3$ and $CeO_2$ as the stabilizer in a specific amount. Sample No. 45 not containing $Al_2O_3$ and spinel suffers severe deterioration in the strength due to the crystal transformation through the hydrothermal testing. Contrary thereto, sample Nos. 46–51 prepared by adding $Al_2O_3$ and spinel in the inventive specific amounts exhibit sufficiently high values of the fracture toughness and bending strength (flexural strength), and substantially retain the tetragonal crystal structure. On the other hand, sample No. 52 containing $Al_2O_3$ and spinel more than the inventive specific amounts provides poor strength.

Table 5 lists sample Nos. 53–67 prepared by adding $CeO_2$ in various amounts (mol %) and $YO_{1.5}$ in gradually increasing amounts (1–8 mol %) while the amount of $Al_2O_3$ and spinel was set constant each at 12.5 wt %. As is apparent in Table 5, the inventive zirconia base sintered bodies are significantly inhibited from the transformation from the tetragonal to monoclinic phase in the hot and the hydrothermal conditions, and maintain high strength even after the hydrothermal testing and after the thermal testing thus suffers little deterioration.

TABLE 3

| Sample Nos. | Composition Stabilizer in $ZrO_2$ Type | Amount (mol %) | $MgO.Al_2O_3$ (wt. %) | Sintering Temp. (°C.) | Density (g/cm³) | $K_{IC}$ (MN/m³/²) |
| --- | --- | --- | --- | --- | --- | --- |
| *39 | $YO_{1.5}/CeO_2$ | 4/5 | 0 | 1500 | 6.08 | 8.1 |
| 40 | " | " | 5 | " | 5.88 | 7.2 |
| 41 | " | " | 10 | " | 5.66 | 7.2 |
| 42 | " | " | 25 | " | 5.15 | 6.8 |
| 43 | " | " | 40 | " | 4.72 | 6.6 |
| *44 | " | " | 80 | 1600 | 4.04 | 4.3 |

| Sample Nos. | Bending Strength (kgf/mm²) | $ZrO_2$ Crystal (%) Monoclinic | Tetragonal | Cubic | Hydrothermal Deterioration Test Results (after 10 hrs) Monoclinic | Bending Strength After Testing (kgf/mm²) |
| --- | --- | --- | --- | --- | --- | --- |
| *39 | 95 | 0 | 82 | 18 | 45 | 20 |
| 40 | 113 | 0 | 84 | 16 | 9 | 115 |
| 41 | 135 | 0 | 84 | 16 | 5 | 129 |
| 42 | 151 | 0 | 86 | 14 | 2 | 148 |
| 43 | 139 | 0 | 88 | 12 | 0 | 135 |
| *44 | 55 | 0 | 85 | 15 | 0 | 52 |

Note
*Comparison Sample

TABLE 4

| Sample Nos. | Composition Stabilizer in $ZrO_2$ Formulation Type | Amount (mol %) | $MgO.Al_2O_3$ (wt. %) | $Al_2O_3$ (wt. %) | Sintering Temp. (°C.) | Density (g/cm³) | $K_{IC}$ (MN/m³/²) |
| --- | --- | --- | --- | --- | --- | --- | --- |
| *45 | $YO_{1.5}/CeO_2$ | 4/5 | 0 | 0 | 1500 | 6.08 | 8.1 |
| 46 | " | " | 1 | 4 | " | 5.93 | 7.2 |
| 47 | " | " | 5 | 10 | " | 5.58 | 7.1 |
| 48 | " | " | 1 | 24 | " | 5.38 | 6.9 |
| 49 | " | " | 12.5 | 12.5 | " | 5.27 | 6.9 |
| 50 | " | " | 20 | 5 | " | 5.21 | 6.8 |
| 51 | " | " | 20 | 20 | " | 4.86 | 6.5 |
| *52 | " | " | 40 | 40 | 1600 | 3.96 | 4.4 |

| Sample Nos. | Bending Strength (kgf/mm²) | $ZrO_2$ Crystal (%) Monoclinic | Tetragonal | Cubic | Hydrothermal Deterioration Test Results (after 10 hrs) Monoclinic | Bending Strength After Testing (kgf/mm²) |
| --- | --- | --- | --- | --- | --- | --- |
| *45 | 95 | 0 | 82 | 18 | 45 | 20 |

TABLE 4-continued

| | | | | | | |
|---|---|---|---|---|---|---|
| 46 | 123 | 0 | 83 | 17 | 10 | 130 |
| 47 | 149 | 0 | 85 | 15 | 3 | 145 |
| 48 | 157 | 0 | 85 | 15 | 3 | 155 |
| 49 | 155 | 0 | 85 | 15 | 3 | 150 |
| 50 | 145 | 0 | 86 | 14 | 2 | 143 |
| 51 | 109 | 0 | 86 | 14 | 1 | 105 |
| *52 | 57 | 0 | 85 | 15 | 0 | 55 |

Note
*Comparison Sample

TABLE 5

| | Composition | | | | | Sintering | | | Bending |
|---|---|---|---|---|---|---|---|---|---|
| | ZrO$_2$ Base Composition | | | | | | | | |
| Sample Nos. | YO$_{1.5}$ (mol %) | CeO$_2$ (mol %) | ZrO$_2$ (mol %) | MgO.Al$_2$O$_3$ (wt %) | Al$_2$O$_3$ (wt %) | Temp. (°C.) | Density (g/cm$^3$) | K$_{IC}$ (MN/m$^{3/2}$) | Strength (kgf/mm$^2$) |
| *53 | 1 | 2.5 | 96.5 | 12.5 | 12.5 | 1500 | Collapse | — | — |
| 54 | 1 | 11.5 | 87.5 | " | " | " | 5.30 | 6.9 | 125 |
| 55 | 1 | 13 | 86 | " | " | " | 5.31 | 6.8 | 131 |
| 56 | 2 | 7 | 91 | " | " | " | 5.30 | 6.8 | 133 |
| 57 | 2 | 9 | 89 | " | " | " | 5.31 | 6.7 | 129 |
| 58 | 3 | 6 | 91 | " | " | " | 5.28 | 6.6 | 147 |
| 59 | 3 | 8 | 89 | " | " | " | 5.29 | 6.7 | 120 |
| 60 | 4 | 4 | 92 | " | " | " | 5.27 | 6.6 | 156 |
| 61 | 4 | 7 | 89 | " | " | " | 5.27 | 6.4 | 123 |
| 62 | 6 | 3 | 91 | " | " | " | 5.27 | 5.9 | 153 |
| 63 | 6 | 6 | 88 | " | " | " | 5.27 | 5.6 | 129 |
| *64 | 6 | 12 | 82 | " | " | " | 5.29 | 4.7 | 58 |
| 65 | 8 | 2 | 90 | " | " | " | 5.27 | 5.5 | 125 |
| 66 | 8 | 4 | 88 | " | " | " | 5.26 | 5.4 | 119 |
| *67 | 8 | 10 | 82 | " | " | " | 5.25 | 4.8 | 45 |

| | | | | Hydrothermal Deterioration Test Results (after 10 hrs) | | Thermal Deterioration Test Results (after 3000 hrs) | |
|---|---|---|---|---|---|---|---|
| Sample Nos. | ZrO$_2$ Crystal (%) | | | | Bending Strength After Testing (kgf/mm$^2$) | | Bending Strength After Testing (kgf/mm$^2$) |
| | Monoclinic | Tetragonal | Cubic | Monoclinic | | Monoclinic | |
| *53 | 100 | 0 | — | — | — | — | — |
| 54 | 0 | 95 | 5 | 5 | 116 | 0 | 123 |
| 55 | 0 | 94 | 6 | 3 | 125 | 0 | 130 |
| 56 | 0 | 94 | 6 | 3 | 130 | 0 | 129 |
| 57 | 0 | 82 | 18 | 3 | 130 | 0 | 127 |
| 58 | 0 | 93 | 7 | 3 | 140 | 0 | 144 |
| 59 | 0 | 82 | 18 | 3 | 123 | 0 | 120 |
| 60 | 0 | 88 | 12 | 2 | 150 | 0 | 153 |
| 61 | 0 | 73 | 17 | 0 | 120 | 0 | 119 |
| 62 | 0 | 83 | 17 | 9 | 135 | 0 | 140 |
| 63 | 0 | 70 | 30 | 0 | 130 | 0 | 125 |
| *64 | 0 | 19 | 81 | 0 | 55 | 0 | 56 |
| 65 | 0 | 73 | 27 | 3 | 120 | 0 | 118 |
| 66 | 0 | 61 | 39 | 2 | 115 | 0 | 123 |
| *67 | 0 | 7 | 93 | 0 | 43 | 0 | 51 |

Note
*Comparison Sample

EXAMPLE 4

Aluminum nitrate and ethyl silicate were mixed in a properties such that provides a mullite composition with water and ethyl alcohol, and the resultant solution was spray-dried at 600° C. The spray-dried powder was calcined at 1000°–1300° C. for 2 hours and pulverized to a synthesized 3Al$_2$O$_3$ SiO$_2$ (mullite) powder product having a specific surface area of 10–50 m$^2$/g, and an Al$_2$O$_3$/SiO$_2$ ratio of 71.8/28.3. (This synthesized mullite showed a density of 3.17 g/cm$^3$ when compacted and sintered at 1600° C.)

A partially stabilized zirconia powder having the compositions shown in Tables 6–8 prepared substantially in the same manner as in Example 3. To this zirconia powder were added said 3Al$_2$O$_3$0.2SiO$_2$ (mullite) and Al$_2$O$_3$ having an average particle size of 0.3 micrometer and 99.9% purity in the proportions shown in Tables 6–8, and mixed, compacted and sintered as in Example 1, except that sintering was made at 1400°–1600° C. The resultant sintered bodies had crystal grain size of 2 micrometers or less.

Testings and measurements were effected as in Example 1, the results being set forth in Tables 6–8.

Table 6 presents samples prepared by adding increasing amounts of 3Al$_2$O$_3$ 2SiO$_2$ (mullite) to the zirconia formulation containing a determined amount of Y$_2$O$_3$ and CeO$_2$. Sample No. 68 containing no mullite suffers severe lowering in the strength after the hydrothermal testing, and shows a great extent of transformation to the monoclinic phase. Contrary thereto, sample Nos. 69–72 containing mullite within the inventive scope show high values in the fracture toughness and bending strength, and retain almost of the tetragonal structure after the hydrothermal testing. On the other hand, sample No. 73 containing mullite more than the inventive scope suffers severe deterioration in the fracture toughness and strength.

Table 7 presents the samples prepared by adding 3Al$_2$O$_3$.2SiO$_2$ (mullite) and Al$_2$O$_3$ in various amounts and proportions to zirconia formulation containing $Y_2O_3$ and $CeO_2$ in a determined proportion. Sample No. 74 not containing mullite and $Al_2O_3$ suffers severe transformation resulting in lowering in the strength. Contrary thereto, the sample Nos. 75–80 containing mullite and $Al_2O_3$ within the inventive scope provide sufficiently high fracture toughness and bending strength, and retain almost the tetragonal structure. On the other hand, the sample No. 81 containing mullite and $Al_2O_3$ more than the inventive scope provides poor strength.

Table 8 presents the sample Nos. 82–96 prepared by adding $CeO_2$ in various amounts and $YO_{1.5}$ in increasing amounts (1–8 mol %) to a zirconia formulation containing each constant amount (12.5 wt %) of $3Al_2O_3.2SiO_2$ and $Al_2O_3$. Based on Table 8, the zirconia base sintered bodies of the present invention exhibit excellent inhibition from the transformation from the tetragonal to monoclinic structure in the hot and the hydrothermal conditions as well as retain high strength even after the hydrothermal testing and after the thermal testing suffering almost no deterioration in the requisite properties.

TABLE 6

| | Composition | | | | | |
|---|---|---|---|---|---|---|
| | Stabilizer in $ZrO_2$ base composition | | | | | |
| Sample Nos. | Type | Amount (mol %) | $3Al_2O_3.2SiO_2$ (wt. %) | Sintering temp. (°C.) | Density (g/cm³) | $K_{IC}$ (MN/m^{3/2}) |
| *68 | $YO_{1.5}/CeO_2$ | 4/5 | 0 | 1500 | 6.08 | 8.4 |
| 69 | " | " | 3 | " | 5.93 | 7.1 |
| 70 | " | " | 10 | " | 5.58 | 7.0 |
| 71 | " | " | 25 | " | 4.96 | 6.8 |
| 72 | " | " | 40 | 1550 | 4.44 | 6.4 |
| *73 | " | " | 80 | 1600 | 3.30 | 3.9 |

| | Bending Strength | $ZrO_2$ crystal (%) | | | Hydrothermal deterioration test result (after 10 hrs) | |
|---|---|---|---|---|---|---|
| Sample Nos. | (kgf/mm²) | Monoclinic | Tetragonal | Cubic | Monoclinic | Bending strength after testing (kgf/mm²) |
| *68 | 95 | 0 | 82 | 18 | 45 | 20 |
| 69 | 105 | 0 | 83 | 17 | 12 | 103 |
| 70 | 115 | 0 | 85 | 15 | 4 | 111 |
| 71 | 127 | 0 | 87 | 13 | 3 | 129 |
| 72 | 115 | 0 | 89 | 11 | 3 | 117 |
| *73 | 32 | 0 | 85 | 15 | 0 | 30 |

Note
*Comparison Sample

TABLE 7

| | Composition | | | | | | |
|---|---|---|---|---|---|---|---|
| | Stabilizer in $ZrO_2$ base composition | | | | Sintering | | |
| Sample Nos. | Type | Amount (mol %) | $3Al_2O_3.2SiO_2$ (wt %) | $Al_2O_3$ (wt %) | temp. (°C.) | Density (g/cm³) | $K_{IC}$ (MN/m^{3/2}) |
| *74 | $YO_{1.5}/CeO_2$ | 4/5 | 0 | 0 | 1500 | 6.08 | 8.1 |
| 75 | " | " | 1 | 4 | " | 5.92 | 6.9 |
| 76 | " | " | 5 | 10 | " | 5.55 | 7.0 |
| 77 | " | " | 1 | 24 | " | 5.36 | 6.9 |
| 78 | " | " | 12.5 | 12.5 | " | 5.15 | 6.8 |
| 79 | " | " | 20 | 5 | " | 5.02 | 6.7 |
| 80 | " | " | 20 | 20 | 1550 | 4.70 | 6.5 |
| *81 | " | " | 40 | 40 | 1600 | 3.80 | 4.0 |

| | Bending Strength | $ZrO_2$ crystal (%) | | | Hydrothermal deterioration test result (after 10 hrs) | |
|---|---|---|---|---|---|---|
| Sample Nos. | (kgf/mm²) | Monoclinic | Tetragonal | Cubic | Monoclinic | Bending strength after testing (kgf/mm²) |
| *74 | 95 | 0 | 82 | 18 | 45 | 20 |
| 75 | 102 | 0 | 84 | 16 | 10 | 105 |
| 76 | 115 | 0 | 85 | 15 | 5 | 115 |
| 77 | 138 | 0 | 85 | 15 | 3 | 130 |
| 78 | 135 | 0 | 85 | 15 | 3 | 131 |
| 79 | 130 | 0 | 85 | 15 | 3 | 129 |
| 80 | 120 | 0 | 86 | 14 | 0 | 118 |
| *81 | 35 | 0 | 85 | 15 | 0 | 33 |

Note
*Comparison Sample

TABLE 8

| Composition | | |
|---|---|---|
| $ZrO_2$ Base Composition | Sintering | Bending |

TABLE 8-continued

| Sample Nos. | $YO_{1.5}$ (mol %) | $CeO_2$ (mol %) | $ZrO_2$ (mol %) | $3Al_2O_3 \cdot 2SiO_2$ (wt %) | $Al_2O_3$ (wt %) | Temp. (°C.) | Density (g/cm³) | $K_{IC}$ (MN/m^{3/2}) | Strength (kgf/mm²) |
|---|---|---|---|---|---|---|---|---|---|
| *82 | 2.5 | 96.5 | 12.5 | 12.5 | 1500 | Collapse | — | — | |
| 83 | 1 | 11.5 | 87.5 | " | " | " | 5.21 | 6.8 | 110 |
| 84 | 1 | 13 | 86 | " | " | " | 5.23 | 6.7 | 113 |
| 85 | 2 | 7 | 91 | " | " | " | 5.18 | 6.6 | 119 |
| 86 | 2 | 9 | 89 | " | " | " | 5.19 | 6.5 | 118 |
| 87 | 3 | 6 | 91 | " | " | " | 5.17 | 6.6 | 121 |
| 88 | 3 | 8 | 89 | " | " | " | 5.18 | 6.5 | 115 |
| 89 | 4 | 4 | 92 | " | " | " | 5.16 | 6.7 | 128 |
| 90 | 4 | 7 | 89 | " | " | " | 5.17 | 6.4 | 113 |
| 91 | 6 | 4 | 90 | " | " | " | 5.16 | 6.0 | 110 |
| 92 | 6 | 6 | 88 | " | " | " | 5.16 | 5.5 | 109 |
| *93 | 6 | 12 | 82 | " | " | " | 5.20 | 4.6 | 56 |
| 94 | 8 | 2 | 90 | " | " | " | 5.15 | 5.4 | 111 |
| 95 | 8 | 4 | 88 | " | " | " | 5.16 | 5.4 | 107 |
| *96 | 8 | 10 | 82 | " | " | " | 5.20 | 4.5 | 54 |

| Sample Nos. | $ZrO_2$ Crystal (%) Monoclinic | $ZrO_2$ Crystal (%) Tetragonal | $ZrO_2$ Crystal (%) Cubic | Hydrothermal Deterioration Test Results (after 10 hrs) Monoclinic | Hydrothermal Deterioration Test Results (after 10 hrs) Bending Strength After Testing (kgf/mm²) | Thermal Deterioration Test Results (after 300 hrs) Monoclinic | Thermal Deterioration Test Results (after 300 hrs) Bending Strength After Testing (kgf/mm²) |
|---|---|---|---|---|---|---|---|
| *82 | 100 | 0 | 0 | — | — | — | — |
| 83 | 0 | 95 | 5 | 5 | 110 | 0 | 108 |
| 84 | 0 | 93 | 7 | 2 | 111 | 0 | 105 |
| 85 | 0 | 93 | 7 | 5 | 120 | 0 | 115 |
| 86 | 0 | 82 | 18 | 3 | 115 | 0 | 121 |
| 87 | 0 | 90 | 10 | 6 | 116 | 0 | 113 |
| 88 | 0 | 81 | 19 | 2 | 110 | 0 | 112 |
| 89 | 0 | 89 | 11 | 5 | 125 | 0 | 120 |
| 90 | 0 | 73 | 27 | 0 | 115 | 0 | 119 |
| 91 | 0 | 75 | 25 | 4 | 113 | 0 | 105 |
| 92 | 0 | 68 | 32 | 0 | 110 | 0 | 103 |
| *93 | 0 | 17 | 83 | 0 | 53 | 0 | 59 |
| 94 | 0 | 74 | 26 | 5 | 110 | 0 | 104 |
| 95 | 0 | 60 | 40 | 2 | 105 | 0 | 100 |
| *96 | 0 | 10 | 90 | 0 | 55 | 0 | 57 |

Note
*Comparison Sample

EXAMPLE 5

An zirconia sol solution prepared by hydrolysis of an aqueous solution of zirconium oxychloride of 99.9% purity was uniformly mixed with yttrium chloride and cerium chloride each of 99.9% purity, and the resulting solution was coagulated with 6N ammonia water to obtain precipitates in the form of a hydroxide followed by washing with water and drying. The dried product was calcined at 900° C. for 2 hours, wet-milled by a ball mill for 48 hours and dried to obtain zirconia powders which were partially stabilized, the mixing was effected so as to provide the compositions, as specified in Table 9. The thus obtained powders had an average particle size of 0.5 micrometer and a specific surface area of 25 m²/g. $Al_2O_3$ and $MgO \cdot Al_2O_3$ each having a mean particle size of 0.3 micrometer and a purity of 99.9% and the synthetic mullite ($3Al_2O_3 \cdot 0.2SiO_2$) as in Example 4, however, with a specific surface area of 30 m²/g and an average particle size of 0.5 micrometer were added to the powders into the proportions as set forth in Table 9 followed by adding a compacting aid, wet-mixed, dried and granulated as in Example 1. The obtained granules were isostatically compacted at a pressure of 1.5 ton/cm², and were then presintered at a temperature of 1300°–1500° C. for 2 hours in the atmosphere. The resulting presintered bodies for further HIP sintering had densities of 95% or more relative to the theoretical density and an average grain size of 0.3–1 micrometer. The presintered bodies were HIP treated at a temperature ranging from 1300 to 1600° C. and a pressure of 150 MPa in an argon atmosphere for 30 minutes. All the sintered bodies thus obtained had a mean crystal grain size of 2 μm or less. The resultant sintered bodies (Nos. 97–109) were tested and measured as in Example 1. The test results are shown in Table 9. As apparent from Table 9, the zirconia base sintered bodies of the present invention provide significant inhibition of the transformation from the tetragonal to monoclinic phase in the hot and the hydrothermal conditions, and retains a high strength after the hydrothermal testing and after the thermal testing showing almost no deterioration.

Additionally, the hot strength (at 500° C.) was measured resulting in a excellent, high value of 130 kgf/mm².

It should be noted that though Table 9 presents samples with only one $YO_{1.5}/CeO_2$ ratio at 4/5 the samples with other ratios falling within the inventive scope, e.g., 4/4, 3/6, 2.5/5.5 and the like were confirmed to provide similar good results.

TABLE 9

| Sample Nos. | Composition $ZrO_2$ Base Composition $YO_{1.5}$ (mol %) | Composition $ZrO_2$ Base Composition $CeO_2$ (mol %) | Composition $ZrO_2$ Base Composition $ZrO_2$ (mol %) | Composition $Al_2O_3$ (wt %) | Composition MgO. $Al_2O_3$ (wt %) | Composition $3Al_2O_3 \cdot 2SiO_2$ (wt %) | Pre-sintering Temp. (°C.) | HIP Treating Temp. (°C.) | Density (g/cm³) | Bending Strength (kgf/mm²) | Average Grain Size (μm) |
|---|---|---|---|---|---|---|---|---|---|---|---|
| 97 | 4 | 5 | 91 | 5 | 0 | 0 | 1400 | 1400 | 5.95 | 160 | 0.2 |

TABLE 9-continued

| | | | | | | | | | | |
|---|---|---|---|---|---|---|---|---|---|---|
| 98 | " | " | " | 10 | 0 | 0 | 1300 | 1400 | 5.79 | 168 | 0.2 |
| 99 | " | " | " | 10 | 0 | 0 | 1400 | 1500 | 5.79 | 170 | 0.5 |
| 100 | " | " | " | 25 | 0 | 0 | 1400 | 1400 | 5.40 | 197 | 0.2 |
| 101 | " | " | " | 25 | 0 | 0 | 1400 | 1500 | 5.40 | 215 | 0.5 |
| 102 | " | " | " | 25 | 0 | 0 | 1500 | 1500 | 5.40 | 221 | 0.5 |
| 103 | " | " | " | 40 | 0 | 0 | 1500 | 1500 | 5.02 | 180 | 0.5 |
| 104 | " | " | " | 40 | 0 | 0 | 1500 | 1600 | 5.02 | 185 | 1.0 |
| 105 | " | " | " | 12.5 | 12.5 | 0 | 1500 | 1500 | 5.28 | 190 | 0.5 |
| 106 | " | " | " | 12.5 | 0 | 12.5 | 1500 | 1500 | 5.16 | 185 | 0.5 |
| 107 | " | " | " | 0 | 25 | 0 | 1500 | 1500 | 5.18 | 181 | 0.5 |
| 108 | " | " | " | 0 | 0 | 25 | 1500 | 1500 | 4.96 | 177 | 0.5 |
| 109 | " | " | " | 0 | 0 | 40 | 1500 | 1500 | 4.45 | 165 | 0.5 |

| | $ZrO_2$ Crystal (%) | | | Hydrothermal Deterioration Test Results (after 30 hrs) | | Thermal Deterioration Test Results (after 3000 hrs) | |
|---|---|---|---|---|---|---|---|
| Sample Nos. | Monoclinic | Tetragonal | Cubic | Monoclinic | Bending Strength After Testing (kgf/mm$^2$) | Monoclinic | Bending Strength After Testing (kgf/mm$^2$) |
| 97 | 0 | 84 | 16 | 7 | 155 | 0 | 163 |
| 98 | 0 | 85 | 15 | 0 | 165 | 0 | 170 |
| 99 | 0 | 86 | 14 | 3 | 173 | 0 | 175 |
| 100 | 0 | 87 | 13 | 0 | 201 | 0 | 189 |
| 101 | 0 | 87 | 13 | 3 | 209 | 0 | 213 |
| 102 | 0 | 87 | 13 | 3 | 213 | 0 | 225 |
| 103 | 0 | 88 | 12 | 0 | 177 | 0 | 185 |
| 104 | 0 | 88 | 12 | 5 | 179 | 0 | 180 |
| 105 | 0 | 86 | 14 | 5 | 186 | 0 | 188 |
| 106 | 0 | 86 | 14 | 5 | 183 | 0 | 179 |
| 107 | 0 | 87 | 13 | 5 | 177 | 0 | 175 |
| 108 | 0 | 87 | 13 | 5 | 175 | 0 | 173 |
| 109 | 0 | 88 | 12 | 0 | 169 | 0 | 171 |

EXAMPLE 6

Figure 2:
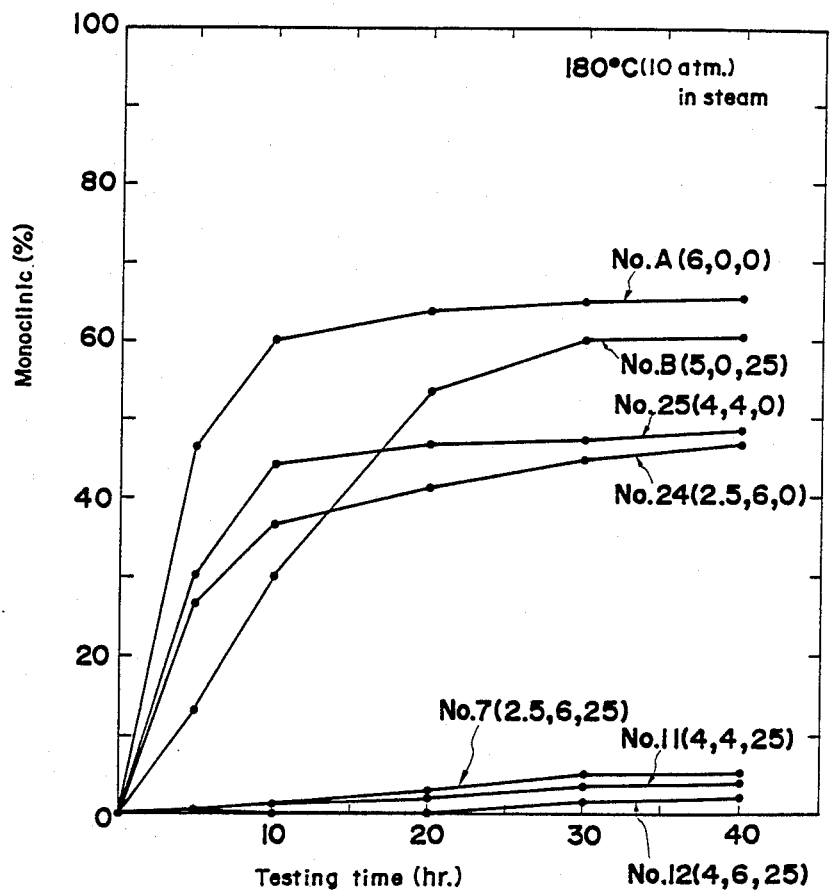
FIG. 2 is a graph showing the relation between the hydrothermal stability testing time and the quantity of a monoclinic crystal structure in Example 6.

Sintered bodies obtained in the same manner as Example 1 were subjected to the hydrothermal deterioration testing and the amount of monoclinic phase was measured thereon as specified in Example 1. The resulting relation of the amount of monoclinic phase versus the treating period of time is shown in FIG. 2.

Figure 3:
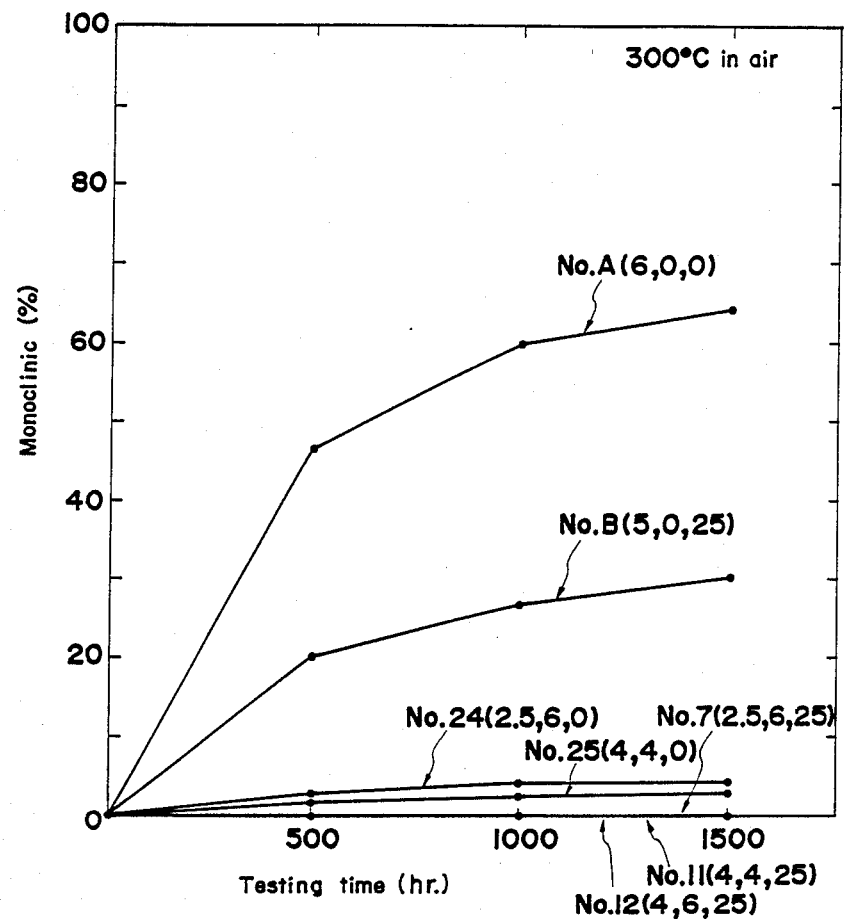
FIG. 3 is a graph showing the relation between the thermal stability testing time and the quantity of a monoclinic crystal structure in Example 6.

Thermal deterioration testing was conducted by placing the sintered bodies in an electric furnace at 300° C. for predetermined periods of time. Thereafter the resulting amount of monoclinic phase was measured on the surface of the heat tested samples. The results are shown in FIG. 3. In FIG. 3, the values in the parentheses denote, $YO_{1.5}$ mol %, $CeO_2$ mol %, and $Al_2O_3$ wt %, sequentially, while Nos. A, B, 24 and 25 are comparative samples.

No. A is a partially stabilized zirconia base sintered body obtained through the coprecipitation method employing only $Y_2O_3$. No. B is a zirconia base sintered body obtained by adding $Al_2O_3$ of 99.9% purity and 0.3 micrometer in size to a coprecipitated zirconia powder containing $Y_2O_3$. Nos. A and B have been sintered at 1500° C. for 2 hours, Nos. 24 and 25 are sintered bodies of an $Y_2O_3$-$CeO_2$-$ZrO_2$ system which contain no $Al_2O_3$ and stand outside the inventive scope.

These results demonstrate that the inventive zirconia base sintered bodies provide excellent stability at 300° C. and the hydrothermal conditions over the comparative samples of the $Y_2O_3$-$ZrO_2$, $Y_2O_3$-$CeO_2$-$ZrO_2$, and $Y_2O_3$-$ZrO_2$-$Al_2O_3$ systems.

EXAMPLE 7

Figure 4:
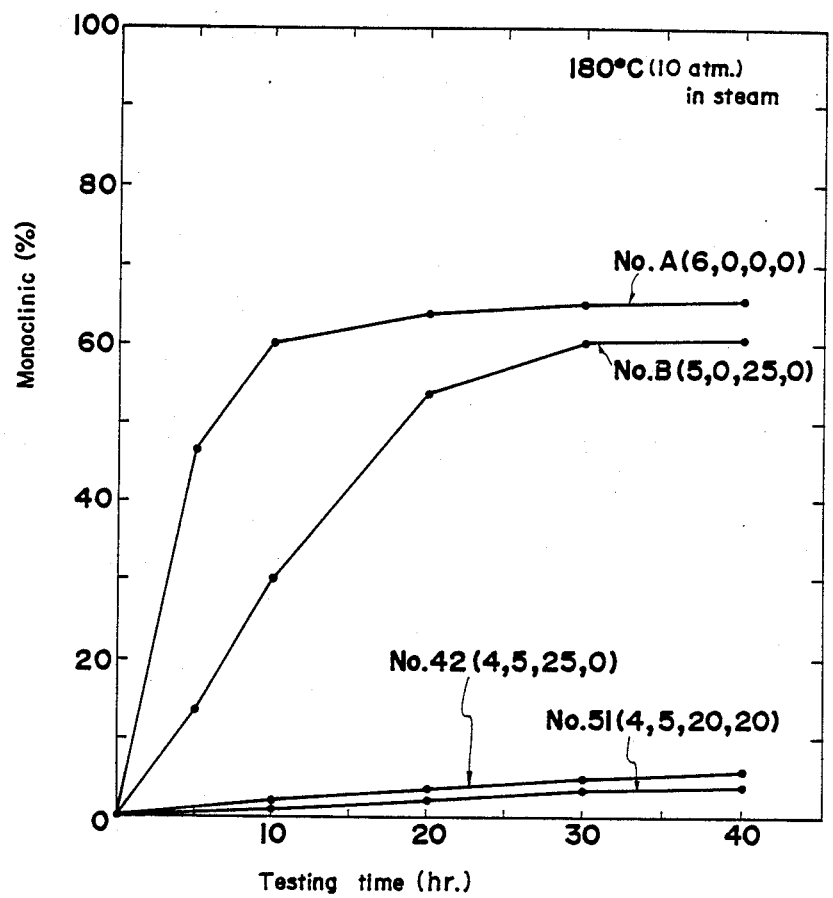
FIG. 4 is a graph showing the relation between the hydrothermal deterioration testing time and the quantity of a monoclinic crystal structure in Example 7.

Sintered bodies obtained in the same manner as Example 3 were subjected to the hydrothermal deterioration testing and the amount of monoclinic phase was measured thereon as specified in Example 1. The resulting relation of the amount of monoclinic phase versus the treating period of time is shown in FIG. 4.

Figure 5:
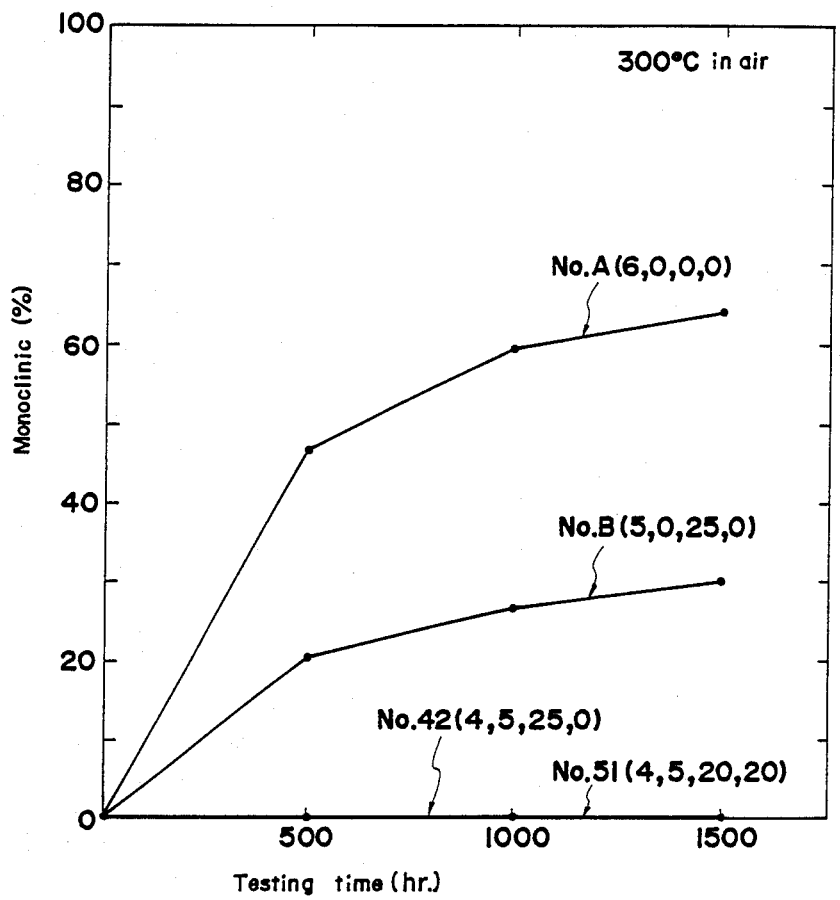
FIG. 5 is a graph showing the relation between the thermal deterioration testing time and the amount of a monoclinic crystal structure in Example 7.

Thermal deterioration testing and measurement were conducted as Example 6. The results are shown in FIG. 5. In FIG. 5, the values in the parentheses denote, $YO_{1.5}$ mol %, $CeO_2$ mol %, $MgO.Al_2O_3$ wt % and $Al_2O_3$ wt %, sequentially, while Nos. A and B are comparative samples.

Nos. A and B were prepared by the coprecipitation method and sintered at 1500° C. for 2 hours.

These results demonstrate that the inventive zirconia base sintered bodies containing $MgO.Al_2O_3$ spinel, or containing both $MgO.Al_2O_3$ spinel and $Al_2O_3$ provide excellent stability at 300° C. and the hydrothermal conditions over the comparative samples. Thus so-called "low temperature stability" can be achieved.

EXAMPLE 8

Figure 6:
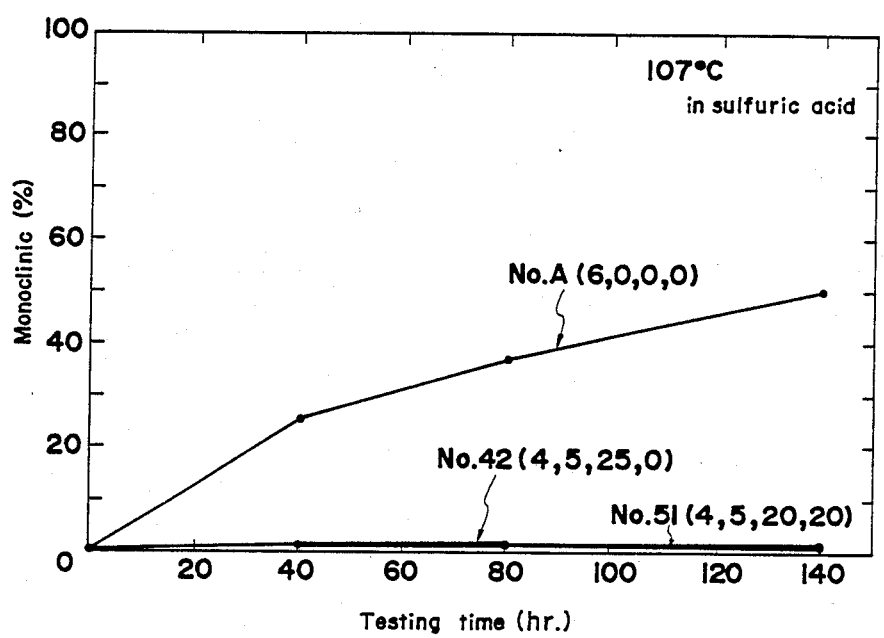
FIG. 6 is a graph showing the relation between the chemical stability testing time and the amount of a monoclinic crystal structure in Example 8.

The sintered body sample Nos. 42 and 51, and the comparative sample No. A prepared as Example 3 were placed and kept in a 30% sulfuric acid solution at 107° C. for up to 140 hours to test the chemical stability and the corrosion resistance and thereafter to measure the amount of the monoclinic phase, the result being set forth in FIG. 6. Further, the weight loss after 500 hour testing is presented in Table 10, which proved the followings. The comparative No. A suffered severe deterioration resulting in a large amount of loss due to the grain boundary removal from the surface area. In contrast thereto, the inventive samples Nos. 42 and 51 proved a high stability.

TABLE 10

| | Chemical Stability Testing | | |
|---|---|---|---|
| Sample No. | A | 42 | 51 |
| Loss in Weight (g/m$^2$) | 4.3 | 0.5 | 0.3 |

EXAMPLE 9

Figure 7:
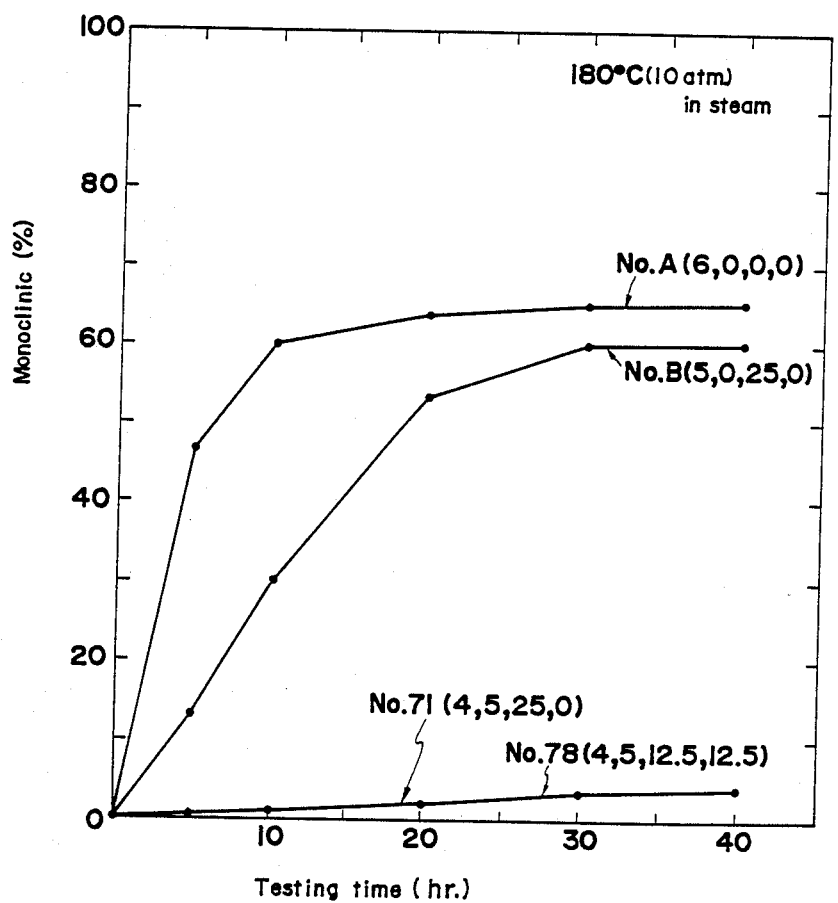
FIG. 7 is a graph showing the relation between the hydrothermal deterioration testing time and the amount of a monoclinic crystal structure in Example 9.
Figure 8:
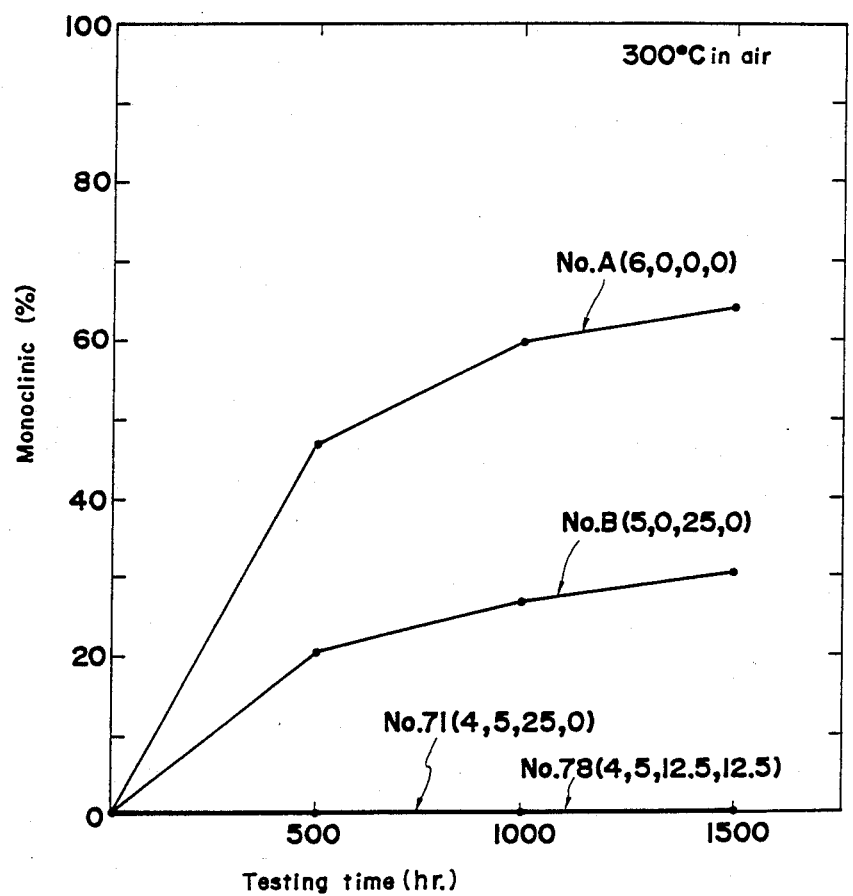
FIG. 8 is a graph showing the relation between the thermal deterioration testing time and the amount of a monoclinic crystal structure in Example 9.

The sintered bodies prepared by the procedures of Example 4 were maintained in saturated steam vapor of 180° C. in an autoclave for hydrothermal deterioration testing, and the quantity of the monoclinic crystal structure on the surface of the sintered samples was measured. The relation between the quantity of the monoclinic crystal structure and the tested period of time is illustrated in FIG. 7. The samples were also maintained in an electrical furnace of 300° C. for different periods of time for thermal deterioration testing, and the quantity of the monoclinic crystal structure on the surface thereof was measured. The relation between the quantity of the monoclinic crystal structure and the testing period of time is shown in FIG. 8.

In the Figures, the values in the parenthesis denote $YO_{1.5}$ mol %, $CeO_2$ mol %, $3Al_2O_3.SiO_2$ wt %, and $Al_2O_3$ wt %, sequentially.

The comparative samples A and B steeply increase the monoclinic amount at the initial stage followed by a gradual increase in the hydrothermal testing. They exhibit similar tendency also in the thermal deterioration testing, i.e., causes a steep increase in the monoclinic amount on the sample surface and cracks at the edge portions thereof, namely resulting in severe deterioration.

On the contrary, it has been found that No. 71 and No. 78 according to the present invention show only a limited increase, viz. about several % or less, in the quantity of the monoclinic crystal structure formed on the surface thereof, and exhibit extremely high stability in the hot and the hydrothermal conditions.

EXAMPLE 10

With Sample Nos. 72 and 78 obtained by the procedures of Example 4 and Comparison Sample No. A used in Example 9, their hot (high-temperature) strength was measured. No. 72 is a sample of the present invention wherein 40 wt % of mullite are added to the raw material formulation obtained by the coprecipitation of a zirconia sol solution with yttrium chloride and cerium chloride, and No. 78 is a sample of the present invention wherein alumina and mullite each in an amount of 12.5 wt % are added to the same raw material formulation.

For the measurement of high-temperature strength, the samples were held at 500° C., 800° C. and 1000° C. according to the measuring method for bending strength, as mentioned in Example 1, to measure the bending strength thereof. The results of measurement are plotted in FIG. 9 with bending strength as ordinate and testing period of time as abscissa.

Figure 9:
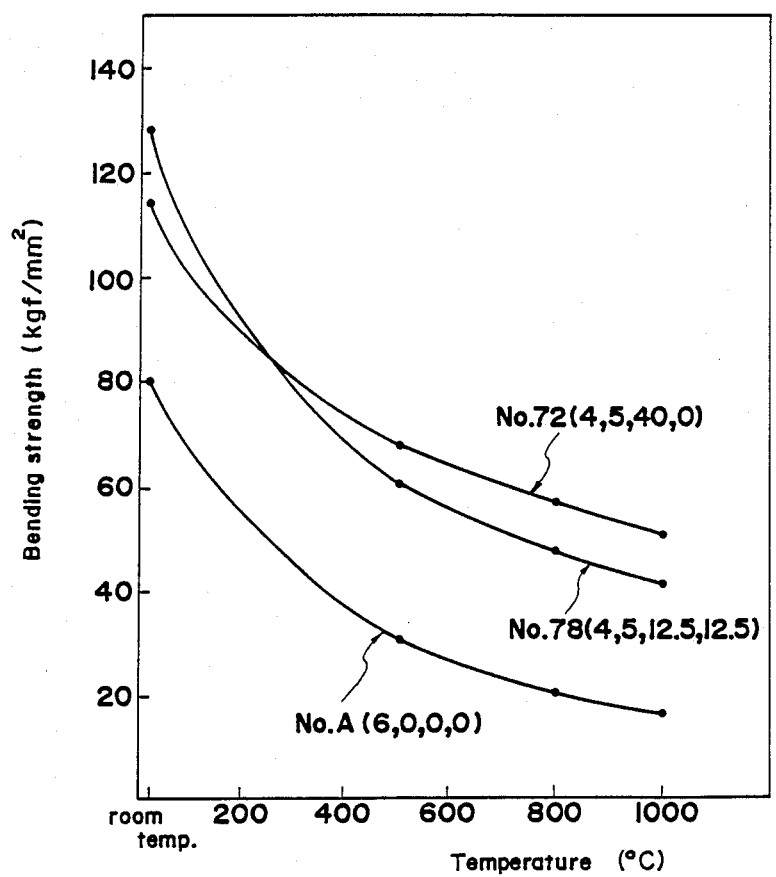
FIG. 9 is a graph showing the relation between the maintaining temperature of high-temperature strength testing and the bending strength in Example 10.

As will be evident from FIG. 9, it has been ascertained that the inventive No. 72 and No. 78 are more improved in the high-temperature strength than comparison sample No. A. In particular, it has been noted that No. 72 shows a more limited decrease in the strength at elevated temperatures.

EXAMPLE 11

With Inventive Sample Nos. 71, 72 and 78 obtained by the procedures of Example 4 and comparison sample No. A of Example 9, their coefficients of thermal expansion were measured at temperatures ranging from 25° C. to 1000° C. The results are given as thermal expansion curves in FIG. 10 with the values of the coefficients of thermal expansion thereof.

Comparison sample No. A shows the highest value of $11.1 \times 10^{-6}$° C.$^{-1}$ due to the absence of mullite. No. 71 containing each 12.5 wt % of mullite and $Al_2O_3$, No. 72 containing each 25% of mullite and $Al_2O_3$, and No. 78 containing 40 wt % mullite show lower values that decrease in that order, as expressed by $9.5 \times 10^{-6}$° C.$^{-1}$, $8.9 \times 10^{-6}$° C.$^{-1}$ and $7.9 \times 10^{-6}$° C.$^{-1}$, respectively. It has thus been ascertained that the values of coefficients of thermal expansion decrease depending upon the increasing amount of mullite to be added.

EXAMPLE 12

Using $MgO.Al_2O_3$ spinel and $3Al_2O_3.2SiO_2$ (mullite) in place of $Al_2O_3$, or substituting such spinel and mullite for a part of, Example 1 was repeated to prepare samples for various testings, as mentioned in the foregoing. The results are set forth in Table 11. The incorporation of $MgO.Al_2O_3$ spinel and mullite as well as the presence of alumina with spinel and mullite have been found to be effective.

As apparent in Table 11, the inventive samples are superior to the comparative samples Nos. 110 and 111 outside of the present invention in the essential properties such as strength and hydrothermal stability based on the extremely little transformation from the tetragonal to monoclinic structure at the hydrothermal conditions. Such effects are believed to be based on the strengthened grain boundaries of $ZrO_2$ due to the synergetic effect of, on the one hand, the presence of spinel and mullite or additionally thereto $Al_2O_3$, and, on the other hand, the copresence of $Y_2O_3$ and $CeO_2$ components, resulting in the ultimately improved stability of the tetragonal $ZrO_2$ in the sintered body which effectively inhibits the transformation from the tetragonal to monoclinic structure in the hot and the hydrothermal conditions.

As detailed in the foregoing, the zirconia base ceramics of the present invention is based on the $ZrO_2-Y_2O_3-CeO_2-Al_2O_3$ system, thereby showing extremely improved stability with respect to heat and hot water or steam over the sintered bodies of the $Y_2O_3-ZrO_2$, $Y_2O_3-CeO_2-ZrO_2$ and $Y_2O_3-ZrO_2-Al_2O_3$ systems as exemplified for the purpose of comparison.

While the embodiments of the high toughness zirconia base ceramics of the present invention has been described as having the desired properties primarily by several-hour sintering at 1400°–1650° C. in the atmosphere, it is understood that similar results are obtained by relying upon sintering effected in vacuum, in an inert gas such as $N_2$, argon or the like, or in an atmosphere of carbon, hydrogen or oxygen, or alternatively the sintering techniques of ceramics such as hot press, HIP or the like. The presintering or the like technique which are generally known in the art may be additionally employed when appropriate.

Minor amounts of impurities may be present without departing from the scope of the present invention so long as the essential feature thereof be maintained. The level of the purities exemplified should be understood as preferred. Modifications may be made without departing from the gist and scope of the present invention as herein disclosed and claimed in the accompanying claims.

TABLE 11

| Composition | | | | | | Sintering | |
|---|---|---|---|---|---|---|---|
| ZrO₂ base Composition | | | | | | | |
| $YO_{1.5}$ | $CeO_2$ | $ZrO_2$ | $Al_2O_3$ | $MgO.Al_2O_3$ | $3Al_2O_3 2SiO_2$ | Temp. | Density |

TABLE 11-continued

| No. | (mol %) | (mol %) | (mol %) | (wt %) | (wt %) | (wt %) | (°C.) | (g/cm³) |
|---|---|---|---|---|---|---|---|---|
| *110 | 6 | 0 | 94 | 0 | 0 | 0 | 1500 | 6.03 |
| *111 | 3 | 6 | 91 | 0 | 0 | 0 | 1500 | 6.04 |
| 112 | 3 | 6 | 91 | 0 | 20 | 5 | 1500 | 5.12 |
| 113 | 3 | 6 | 91 | 0 | 5 | 20 | 1500 | 4.98 |
| 114 | 3 | 6 | 91 | 15 | 5 | 5 | 1500 | 5.24 |

| No. | $K_{IC}$ (MN/m$^{3/2}$) | Bending Strength (kgf/mm²) | ZrO₂ Crystal (%) | | | Hydrothermal Deterioration Test Results (After 10 hr) | |
|---|---|---|---|---|---|---|---|
| | | | Monoclinic | Tetragonal | Cubic | Monoclinic | Bending Strength After Testing (kgf/mm²) |
| *110 | 8.0 | 100 | 0 | 85 | 15 | 65 | 21 |
| *111 | 8.2 | 83 | 0 | 87 | 13 | 45 | 12 |
| 112 | 6.8 | 139 | 0 | 88 | 12 | 3 | 135 |
| 113 | 6.9 | 133 | 0 | 88 | 12 | 4 | 130 |
| 114 | 6.9 | 142 | 0 | 89 | 11 | 2 | 139 |

Note
*Comparison Sample

What is claimed is:

1. Zirconia base ceramics which:
   (a) consist essentially of at least 40 weight % of paritally stabilized zirconia of the $ZrO_2$-$Y_2O_3$-$CeO_2$ system wherein the proportion of $ZrO_2$, $Y_2O_3$ and $CeO_2$ is within the range defined by the line connecting points F, G, L, M, N, and K in a ternary diagram ($ZrO_2$, $YO_{1.5}$, $CeO_2$), the vertices of said points being given by the following molar % of $ZrO_2$, $YO_{1.5}$ and $CeO_2$, respectively:
   F (88, 10, 2),
   G (89, 10, 1),
   L (93.5, 4, 2.5),
   M (93, 2, 5),
   N (88, 1, 11), and
   K (86, 1, 13),
   and 3 to 60 weight % of $Al_2O_3$, and
   (b) has a mean crystal grain size not exceeding 2 micrometers and a bending strength of at least 100 kgf/mm², said $ZrO_2$ containing a minimum of 50 vol % tetragonal crystal structure and a maximum of 5 vol % monoclinic crystal structure when tested in steam of 180° C. and 10 atm for 10 hours.

2. Zirconia base ceramics as defined in claim 1, which has quantity of said monoclinic crystal structure not exceeding 5 vol % when tested in an atmosphere of 300° C. for 3000 hours.

3. Zirconia base ceramics as defined in claim 1, wherein the amount of $Al_2O_3$ is 5 to 50 weight %.

4. Zirconia base ceramics as defined in claim 3, wherein the amount of $Al_2O_3$ is 15 to 35 weight %.

5. Zirconia base ceramics which:
   (a) consists essentially of at least 40 weight % of partially stabilized zirconia of the $ZrO_2$-$Y_2O_3$-$CeO_2$ system wherein the proportion of $ZrO_2$, $Y_2O_3$ and $CeO_2$ is within the range defined by the line connecting points F, G, L, M, N and K in a ternary diagram ($ZrO_2$, $YO_{1.5}$, $CeO_2$), the vertices of said points being given by the following molar % of $ZrO_2$, $YO_{1.5}$ and $CeO_2$, respectively:
   F (88, 10, 2),
   G (89, 10, 1),
   L (93.5, 4, 2.5),
   M (93, 2, 5),
   N (88, 1, 11), and
   K (86, 1, 13),
   and 3 to 60 weight % of $MgO.Al_2O_3$ spinel, and
   (b) has a means crystal grain size not exceeding 2 micromenters and a bending strength of a least 100 kgf/mm², said $ZrO_2$ containing a minimum of 50 vol % tetragonal crystal structure and a maximum of 5 vol % monoclinic crystal structure when tested in steam of 180° C. and 10 atm for 10 hours.

6. Zirconia base ceramics as defined in claim 5, which have a quantity of said monoclinic crystal structure not exceeding 5 vol % when tested in an atmosphere of 300° C. for 3000 hours.

7. Zirconia base ceramics as defined in claim 10, which have a quantity of said monoclinic crystal structure not exceeding 30 vol % when tested in a sulfuric solution for 100 hours.

8. Zirconia base ceramics as defined in claim 5, wherein the amount of $MgO.Al_2O_3$ spinel is 5 to 50 weight %.

9. Zirconia base ceramics as defined in claim 8, wherein the amount of $MgO.Al_2O_3$ spinel is 15 to 35 weight %.

10. Zirconia base ceramics as defined in claim 5, wherein a part of the $MgO.Al_2O_3$ spinel is replaced by $Al_2O_3$.

11. Zirconia base ceramics which:
    (a) consists essentially of at least 40 weight % of patially stabilized zirconia of the $ZrO_2$-$Y_2O_3$-$CeO_2$ system wherein the proportion of $ZrO_2$, $Y_2O_3$ and $CeO_2$ is within the range defined by the line connecting points F, G, L, M, N and K in a ternary diagram ($ZrO_2$, $YO_{1.5}$, $CeO_2$), the vertices of said points being given by the following molar % of $ZrO_2$, $YO_{1.5}$ and $CeO_2$, respectively:
    F (88, 10, 2),
    G (89, 10, 1),
    L (93.5, 4, 2.5),
    M (93, 2, 5),
    N (88, 1, 11), and
    K (86, 1, 13),
    and 3 to 60 weight % of mullite, and
    (b) has a mean crystal grain size not exceeding 2 micrometers and a bending strength of at least 100 kgf/mm², said $ZrO_2$ containing a minimum of 50 vol % tetragonal crystal structure and a maximum of 5 vol % monoclinic crystal structure when tested in steam of 180° C. and 10 atm for 10 hours.

12. Zirconia base ceramics as defined in claim 11, which have a quantity of said monoclinic crystal structure not exceeding 5 vol % when tested in an atmosphere of 300° C. for 3000 hours.

13. Zirconia base ceramics as defined in claim 11, wherein the amount of mullite is 5 to 50 weight %.

14. Zirconia base ceramics as defined in claim 13, wherein the amount of mullite is 15 to 35 weight %.

15. Zirconia base ceramics as defined in claim 11, wherein the bending strength at 500° C. is at least 50 kgf/mm².

16. Zirconia base ceramics as defined in claim 11, wherein the mullite amount is at least 10 weight % and the coefficient of the linear thermal expansion is $1 \times 10^{-5}$° C.$^{-1}$ or less.

17. Zirconia base ceramics as defined in claim 11, wherein a part of the mullite is replaced by $Al_2O_3$.

18. Zirconia base ceramics which:
(a) consists essentially of at least 40 weight % of partially stabilized zirconia of the $ZrO_2$-$Y_2O_3$-$CeO_2$ system wherein the proportion of $ZrO_2$, $Y_2O_3$ and $CeO_2$ is within the range defined by the line connecting points F, G, L, M, N and K in a ternary diagram ($ZrO_2$, $YO_{1.5}$, $CeO_2$), the vertices of said points being given by the following molar % of $ZrO_2$, $YO_{1.5}$, and $CeO_2$, respectively:
F (88, 10, 2),
G (89, 10, 1),
L (93.5, 4, 2.5),
M (93, 2, 5),
N (88, 1, 11), and
K (86, 1, 13),
and 5 to 60 weight % of the sum of $MgO.Al_2O_3$ spinel and mullite, provided that any one of the spinel and mullite is 3 weight % or more, and (b) has a mean crystal grain size not exceeding 2 micrometers and a bending strength of at least 100 kgf/mm², said $ZrO_2$ containing a minimum of 50 vol % tetragnal crystal structure and a maximum of 5 vol % monoclinic crystal structure when tested in steam of 180° C. and 10 atm for 10 hours.

19. Zirconia base ceramics as defined in claim 18, which have a quantity of said monoclinic crystal structure not exceeding 5 vol % when tested in an atmosphere of 300° C. for 3000 hours.

20. Zirconia base ceramics as defined in claim 18, wherein the sum of the $MgO.Al_2O_3$ spinel and mullite is 50 weight % or less.

21. Zirconia base ceramics as defined in claim 20, wherein the sum of the $MgO.Al_2O_3$ spinel and mullite is 15 to 35 weight %

22. Zirconia base ceramics as defined in claim 16, wherein the amount of mullite is at least 10 weight %.

23. Zironia base ceramics as defined in claim 20, wherein the bending strength at 500° C. is at least 60 kgf/mm².

24. Zirconia base ceramics as defined in claim 20, wherein the coefficient of linear thermal expansion between 25° and 1000° C. is $1 \times 10^{-5}$° C.$^{-1}$ or less.

25. Zirconia base ceramics as defined in claim 18, wherein the amount of the $MgO.Al_2O_3$ spinel is at least 10 weight %.

26. Zirconia base ceramics according to claims 1, 5, or 18, wherein $ZrO_2$ does not exceed 92% in the ternary diagram of FIG. 1.

* * * * *